United States Patent [19]

Lippmann et al.

[11] Patent Number: 5,394,344
[45] Date of Patent: Feb. 28, 1995

[54] SLEW RATE LIMITER WITH ASYMMETRICAL OPERATION

[75] Inventors: Raymond Lippmann, Ann Arbor; James E. Nelson, Waterford; Michael J. Schnars, Clarkston; James R. Chintyan, Davison; Mark C. Hansen, Ann Arbor, all of Mich.; James M. Aralis, Mission Viejo; Frank J. Bohac, Jr., Laguna Hills, both of Calif.

[73] Assignee: Delco Electronics Corporation, Kokomo, Ind.

[21] Appl. No.: 944,158

[22] Filed: Sep. 11, 1992

[51] Int. Cl.⁶ ............................................. G01C 25/00
[52] U.S. Cl. .................... 364/571.02; 340/450.2; 340/618; 364/571.01
[58] Field of Search ............ 73/290 R, 430; 340/618, 340/450, 450.2, 612; 328/129.1, 130.1; 377/20; 364/509, 571.01, 571.02, 571.04

[56] References Cited

U.S. PATENT DOCUMENTS

| | | | |
|---|---|---|---|
| 3,115,615 | 12/1963 | Saper | 340/37 |
| 3,983,549 | 9/1976 | Akita et al. | 340/206 |
| 3,990,073 | 11/1976 | Duttweiler | 340/347 |
| 4,102,191 | 7/1978 | Harris | 73/313 |
| 4,243,974 | 1/1981 | Mack | 340/347 |
| 4,250,750 | 2/1981 | Martinec et al. | 73/308 |
| 4,309,692 | 1/1982 | Crosby | 340/347 |
| 4,386,406 | 5/1983 | Igarashi et al. | 364/442 |
| 4,470,296 | 9/1984 | Kobyashi et al. | 73/113 |
| 4,481,597 | 11/1984 | Robbins | 364/604 |
| 4,509,044 | 4/1985 | Yachida | 364/509 |
| 4,513,277 | 4/1985 | Moore et al. | 340/59 |
| 4,546,343 | 10/1985 | Higgins et al. | 340/347 |
| 4,614,114 | 9/1986 | Matsumoto et al. | 73/313 |
| 4,635,043 | 1/1987 | Kronenberg et al. | 340/618 |
| 4,760,736 | 8/1988 | Huynh | 73/430 |
| 4,768,377 | 9/1988 | Habelmann et al. | 73/313 |
| 4,810,953 | 3/1989 | Huynh | 324/120 |
| 4,890,491 | 1/1990 | Vetter et al. | 73/290 |
| 4,897,822 | 1/1990 | Korten et al. | 367/124 |
| 4,912,646 | 3/1990 | Cerruti | 364/509 |
| 4,916,535 | 4/1990 | Volodchenko et al. | 358/101 |
| 4,982,350 | 1/1991 | Perna et al. | 364/569 |
| 4,991,435 | 2/1991 | Colarossi | 73/313 |
| 5,257,300 | 10/1993 | Bennett et al. | 73/430 |

OTHER PUBLICATIONS

Electronic Circuits—Digital and Analog, Charles A. Holt, pp. 794–795, 1978.

Primary Examiner—Emanuel T. Voeltz
Assistant Examiner—Craig Miller
Attorney, Agent, or Firm—Anthony L. Simon; Jimmy L. Funke

[57] ABSTRACT

An apparatus for processing data, such as liquid level data in a motor vehicle containing a liquid storage tank, comprises a liquid level sensor for developing a signal indicative of instantaneous liquid level in the storage tank, circuitry for processing the instantaneous liquid level signal, including asymmetrical filtration of the instantaneous liquid level signal, to provide a process output signal, and a display apparatus for displaying an indication of the level of liquid in the storage tank in response to the process output signal.

43 Claims, 20 Drawing Sheets

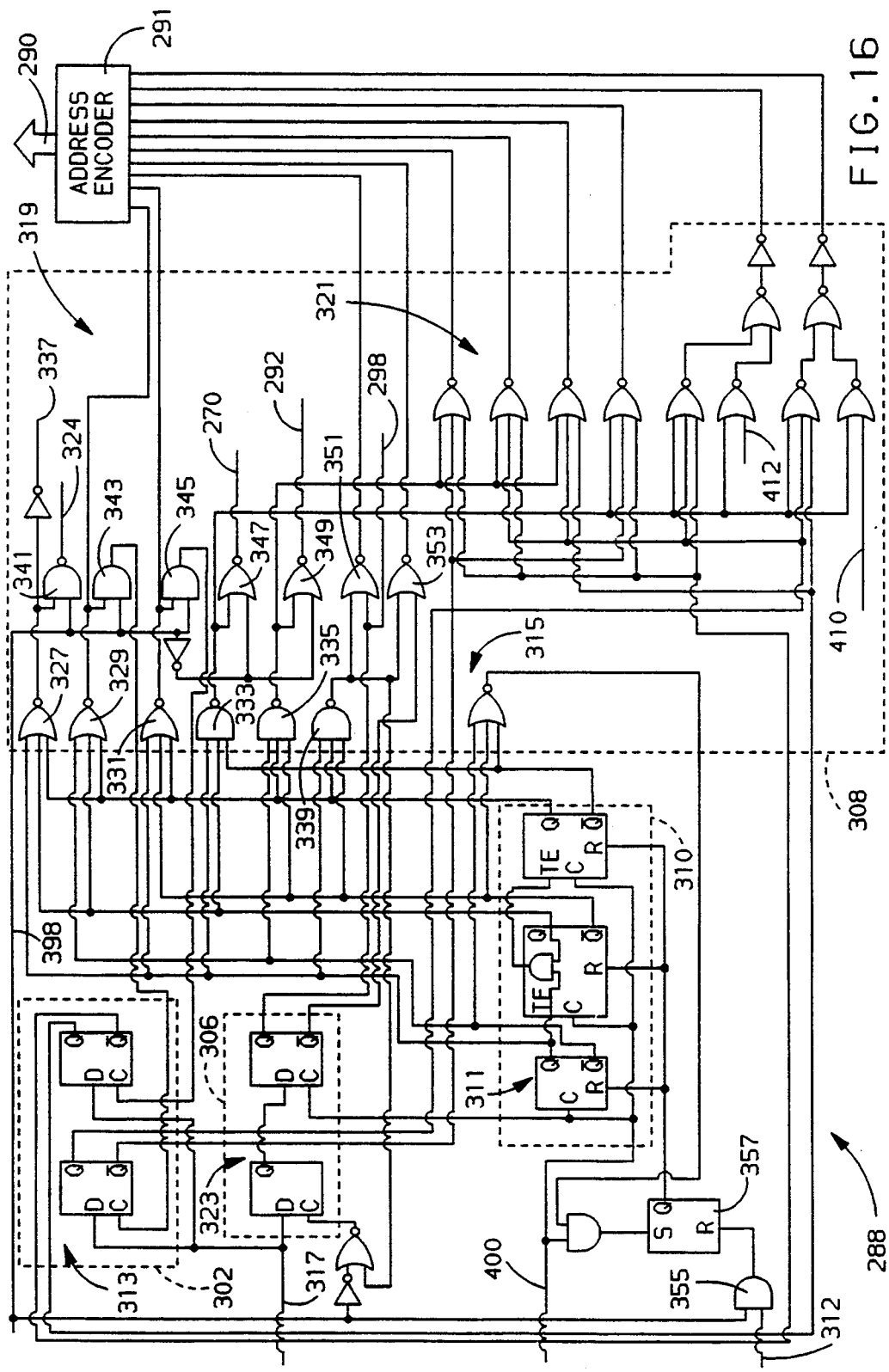

SLEW RATE LIMITER WITH ASYMMETRICAL OPERATION

The subject of this specification is related to copending applications, Attorney Docket Numbers G-6700, entitled "Electronic Gauge Transform," G-6698, entitled "Fuel Wobbler," G-6699, entitled "Maintaining Ratiometric Data in Electronically Manipulated Signal Processing Systems," and G-8966, entitled "Gauge Glider, all filed concurrently with this specification and assigned to the assignee of this invention.

This invention pertains to the processing of measurement data, and more particularly to the processing of measurement data that may vary around a measurement level in an asymmetrical manner, e.g., sender data in motor vehicle systems where the tanks or reservoirs are subject to varying accelerations due to vehicle motion.

BACKGROUND OF THE INVENTION

Fuel senders in automotive fuel tanks typically consist of a float on the end of a pivot arm, which is connected to a means for providing variable resistance in such a way that, as the float moves up and down on the surface of the fuel, the resistance value of the resistance means changes. A resistor is typically coupled in series with the resistance means and voltage is applied across the circuit. As the resistance of the resistance means changes, the voltage across the resistance means changes. The voltage across the resistance means is used as the sender output signal and is used as an input to a fuel gauge for indicating the amount of fuel in the tank. The fuel gauge is typically a conventional three coil air core gauge with two coils being biased to a set voltage and the third coil being energized in relation to the output signal of the fuel sender. A pointer connected to an axle of a permanent magnet rotor is rotated in relation to the energization of the third coil of the air core gauge.

Because motor vehicles are subject to varying accelerations due to changes in vehicle speeds and direction, fuel in the fuel tank tends to slosh, unless the tank is full. Bumpy roads may also cause the fuel in the tank to slosh. Unless countermeasures are taken, fuel slosh is reflected in the fuel gauge reading as wavering of the gauge pointer, making determination of the actual fuel level difficult for the vehicle operator.

Presently various measures are available to partially reduce the affects of fuel slosh on the fuel reading. One example is the addition of baffles to the fuel tank, increasing the cost of the tank. Another example is damping the response of the gauge with a viscous fluid, slowing the response of the gauge.

Electronic damping of the output signal of the sender can reduce the effects of fuel slosh, reducing or eliminating the requirements of baffles and viscous damping fluid. Further improvements are still sought over conventional electronic damping techniques.

SUMMARY OF THE PRESENT INVENTION

The present invention offers improvement in the processing of data provided by liquid level senders and other types of senders. The improvements of this invention are directed to minimizing the affects of an asymmetric bias on sender outputs. An asymmetric bias of the type which this invention compensates for may be due to uneven sloshing of liquid in a liquid storage tank, or by clipping of the waveform of a data signal.

The preferred implementation of this invention in a motor vehicle is to minimize the effects of fuel slosh on the fuel gauge reading and to improve the response time of the the system. The affects of fuel slosh on the fuel gauge reading are minimized by providing filtration means with asymmetrical operation to compensate for uneven fuel slosh. Also, the varying fuel slosh characteristics at different fuel levels in the tank are compensated for by varying the asymmetric characteristics of the filtration means in relation to the fuel level of the tank. The specific structure of the filter of this invention improves the response time of the system. The apparatus of this invention is suitable for implementation into a microprocessor based system or, preferably, fabrication into a custom integrated circuit.

Structurally, the apparatus of this invention comprises means for developing a data signal indicative of an instantaneous parameter level, means for processing the data signal, including asymmetrical filtration of the data signal, to provide a process output signal, and means for displaying an indication of the parameter in response to the process output signal.

BRIEF DESCRIPTION OF THE DRAWINGS

FIGS. 15 and 16 comprise a schematic diagram of a preferred implementation of this invention.

DETAILED DESCRIPTION OF THE INVENTION

Figure 1:
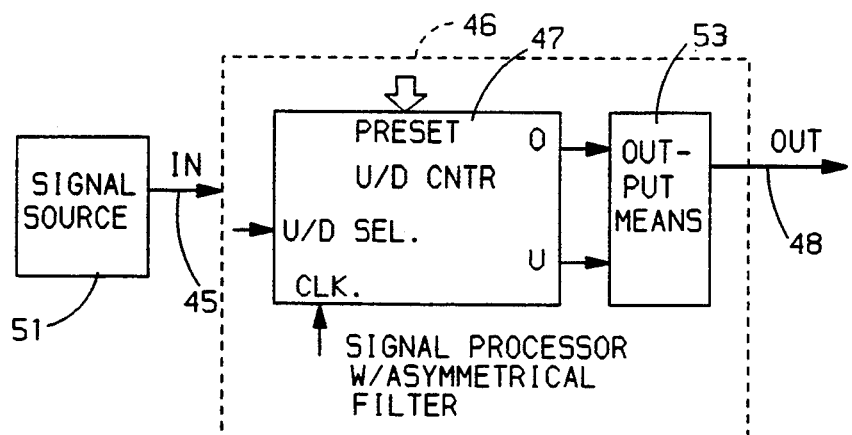
FIG. 1 is a schematic diagram of the apparatus of this invention.

In the apparatus of this invention shown in FIG. 1, a signal source means 51, provides a data signal on line 45, which is input to the signal processor 46. The signal processor 46 comprises an up/down counter 47, including overflow and underflow outputs that provide overflow and underflow signals. Up/down counter 47 also includes a preset input that has a variable preset value determined in response to a control signal. In response to the data signal on line 45, up/down counter 47 either counts up or counts down. When up/down counter 47 overflows or underflows, the overflow and underflow signals are generated. In response to the overflow and underflow signals, an output signal means 53 provides an output signal on line 48, which is an asymmetrically filtered representation of the data signal on line 45. More detailed illustrations of the operations of this invention are set forth by way of example below.

Figure 2:
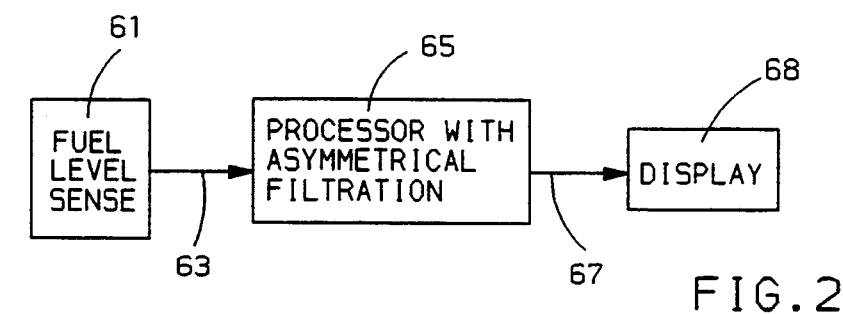
FIG. 2 is an illustration of a preferred implementation of this invention.

Referring to FIG. 2, the preferred implementation of this invention is in a motor vehicle liquid level gauge system, such as a fuel gauge apparatus for a motor vehicle. In the figure, means 61 provides a signal on line 63 indicative of the level of fuel in the vehicle fuel tank. The signal on line 63 may fluctuate with fuel slosh in an asymmetrical manner with respect to the true level of fuel in the tank. The processor with asymmetrical filtration 65 receives the signal from line 63 and asymmetrically filters the signal from line 63, compensating for asymmetrical fluctuation in the signal. The processor with asymmetrical filtration 65 outputs the filtered signal on line 67 to drive display 68 which accurately portrays the amount of fuel in the vehicle fuel tank.

Figure 3:
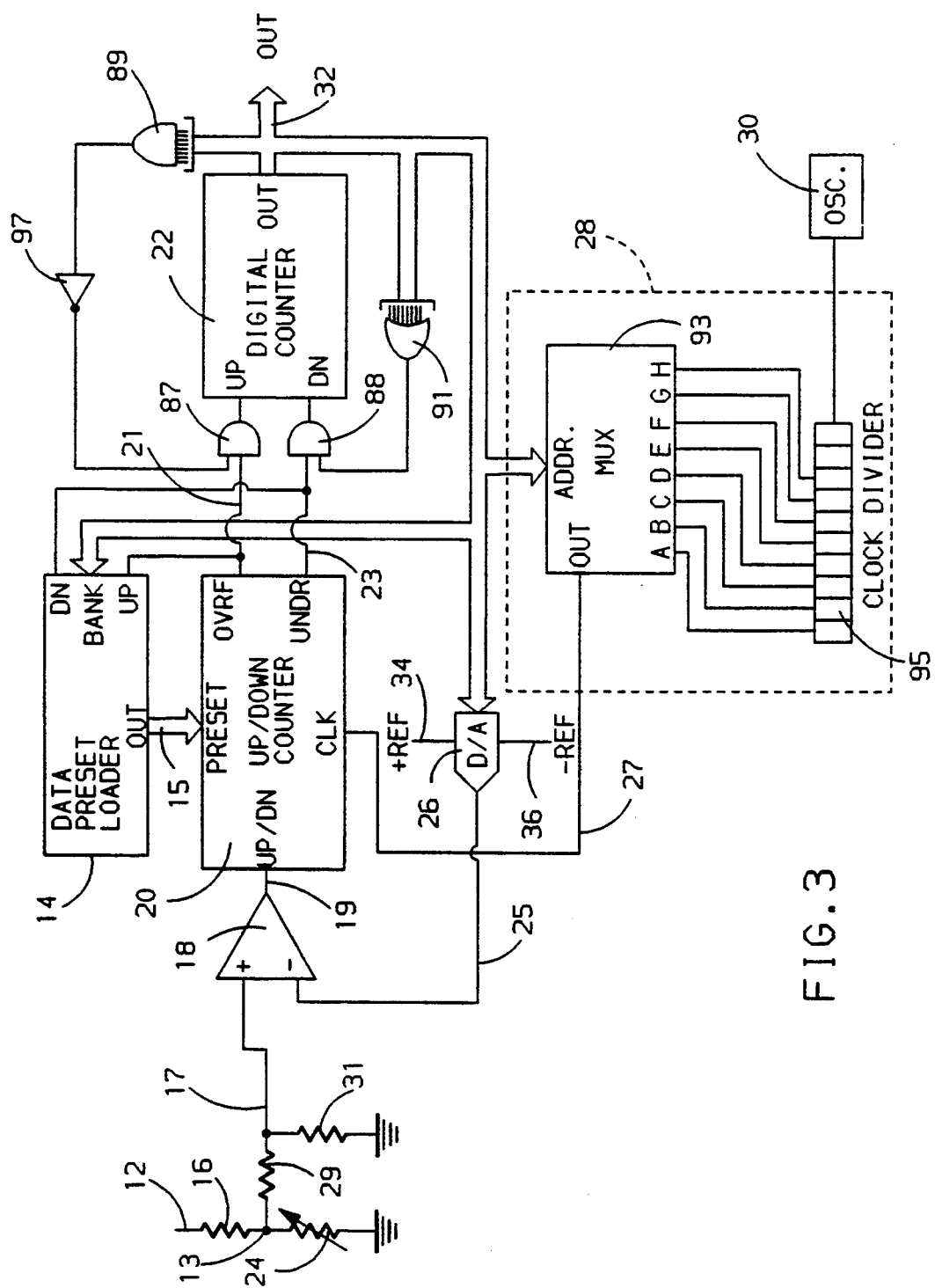
FIG. 3 is a schematic block diagram of this invention.

The improvements of this invention can be better understood with the example vehicle fuel system implementation set forth in FIG. 3, which pertains to an application of this invention into an automotive fuel gauge system. Referring to the figure, vehicle ignition voltage is supplied on line 12 and to a resistor divider pair comprising load resistor 16 and fuel sender 24. The impedance of the fuel sender 24 varies with the level of fuel in the vehicle fuel tank, varying the voltage level at line 13. The voltage level of the signal on line 13 is divided through a resistor divider pair comprising resistors 29 and 31 resulting in a signal on line 17 of a voltage level suitable for processing with integrated circuitry and proportional to the signal on line 13.

Line 17 is connected to the non-inverting input of comparator 18. The inverting input of comparator 18 is connected to line 25, which contains an analog signal representing the asymmetric filter output, which may also be the presently displayed fuel level.

Output line 19 of comparator 18, is connected to the up/down select of programmable up/down counter 20. Up/down counter 20 is a six bit counter that counts up or down with every clock pulse at the clock input, depending on the signal on line 19, with an underflow condition occurring when the counter counts down to zero and an overflow condition occurring when the counter counts up to 63. When an overflow or underflow condition occurs, the counter resets itself to a preset value, determined by the preset inputs, to which bus 15 is connected. Separate preset inputs may be provided for overflow and underflow conditions.

In an example operation of the up/down counter 20, suppose an overflow condition occurs, and the counter resets to a preset value of 32, as determined by data bus 15. Now the counter 20 must, on average, clock up 31 or clock down to zero before an overflow or underflow occurs. The counter 20 filters out high frequency signals on line 19 because several counts up of the counter 20 and several counts down again result in no change in the output of counter 22. Also, the counter, with the preset at 32, operates as a symmetrical filter, requiring about as many clock counts up to overflow as it does counts down to underflow.

If, however, the preset of the counter is set closer to 63 or closer to zero, the counter does not operate as a symmetrical filter, but as an asymmetrical filter. Requiring, in one instance less counts to overflow than to underflow, and in the other instance less counts to underflow than to overflow. In order for up/down counter 20 to overflow, a positive signal on line 19 must be present for at least $(63-reset)/f$ seconds, where 63 is the overflow value of the counter, reset is the reset value and f is the frequency of the clock input to up/down counter 20 on line 27. In order for up/down counter 20 to underflow, a logic low signal on line 19 must be present for at least $reset/f$ seconds. The asymmetrical filtration of the counter 20 allows for improved accuracy of fuel level indication as will be explained further below.

At the comparator 18, if the signal on line 17 is greater than the signal on line 25, then the output of the comparator 18 is high, selecting the incrementing mode for the up/down counter 20. If the signal on line 17 is lower than the signal on line 25, then the output of the comparator 18 is low, selecting the decrementing mode for the up/down counter 20. If the up/down counter 20 is selected in the incrementing mode, it counts up with each clock pulse on line 27 connected to the clock input. When an overflow signal occurs on line 21, the up select of data preset loader 14 is triggered and the up/down counter 20 is reset with a preset value provided through bus 15.

Likewise, when the up/down counter 20 is selected in the decrementing mode and an underflow signal is triggered on line 23, the down select of the data preset loader 14 is triggered, resetting the up/down counter 20 with a preset value provided through bus 15.

The clock pulse on line 27 is provided by the oscillator 30 and the clock divider 28. Clock divider 28 may comprise a set of frequency dividers 95 connected in series so that the frequency of the signal output from each frequency divider is one half the frequency of the signal output from the preceding divider.

The clock signal on line 27 may be a function of the filter output on bus 32. To implement this function, the three most significant bits lines of data bus 32 are connected to the address input of multiplexer 93. The data inputs A–H of multiplexer 93 receive clock signals from the dividers 95. In general, it is preferred that as the signal on bus 32 indicates higher fuel levels, multiplexer 93 selects lower frequencies that are output on clock line 27. However, the relationship between the clock frequency and the fuel level may be any desired relationship, and not necessarily a relationship of inverse proportion.

The data preset loader 14 receives a data signal through bus 32, which indicates the display fuel level. The data signal in bus 32 may be referred to as the process output signal or the control signal. In response to the data on bus 32, the data preset loader 14 may vary the preset values on bus 15, to compensate for varying slosh characteristics of the fuel tank at different fuel levels. This operation will be explained in greater detail further below.

In addition to being connected to the up and down inputs of the data preset loader 14, the overflow and underflow output lines 21 and 23 are connected to digital counter 22. The digital counter 22 is preferably an eight bit counter and increments its digital output signal on bus 32 with every pulse input to the clock up input through line 21 and AND gate 87 and decrements its digital output signal with every pulse input to the clock down input through line 23 and AND gate 88.

The signal on bus 32 is used to drive a display, which may be either digital or analog. Specific fuel gauge implementations are set forth further below.

The display drive signal on bus 32 is also fed into the digital to analog (D/A) converter 26. The D/A converter 26 converts the digital signal on bus 32 into a proportional analog signal on line 25. The signal on line 25 is the analog signal representing the asymmetric filter output connected to the inverting input of comparator 18.

AND gates 87, 88 and 89, OR gate 91 and inverter 97 prevent digital counter 22 from overflowing or underflowing. OR gate 91 ORs all of the lines of bus 32. If the output of OR gate 91 is zero, indicating that the signal on line 32 is zero, AND gate 88 inhibits pulses to the clock down input of digital counter 22, preventing digital counter 22 from counting below zero. AND gate 89 ANDs all of the lines of bus 32. If the output of AND gate 89 is high, inverter 97 and AND gate 87 inhibit pulses to the clock up input of digital counter 22, preventing digital counter 22 from counting above FF(hex).

The advances of this invention can be better understood through a description of the operation of the above circuit in conjunction with a vehicle fuel tank. In a first condition, assume that a vehicle containing a fuel tank is at rest. In this case, there is no disturbance of the fuel in the tank, and consequently no fluctuation of the signal on line 17. In this example, the signal on line 25 is virtually equal to the signal on line 17. If fuel is now added to the tank, the signal on bus 32 will promptly achieve the signal representative of the actual fuel in the tank.

The promptness of gaining an accurate fuel level signal on bus 32 is achieved by utilization of up/down counter 20 to filter the signal on line 19 instead of a conventional weighted average filter. Functionally, the counter 20 enables the gap between the signal on bus 32 and a target signal indicative of actual fuel level to be closed at a constant rate, regardless of the difference between the sender signal and the signal on line 25. A weighted average filter, on the other hand, would slow the closing of the gap between the signal on bus 32 and the target signal as the target signal is approached. This characteristic of weighted average filters is caused because the closure rate of the output signal to the target signal is proportional to the error between the input and output. Consequently, as the error is reduced, the closure rate is reduced.

Assume now that the fuel tank is full. There is no room for slosh in the full fuel tank, and the sender signal does not vary with vehicle motion. This case is similar to when the vehicle is not in motion.

If the tank is mostly full, e.g., ¾ full, there is fuel slosh that occurs in response to vehicle acceleration, including braking and turning. In a system with a conventional filter, sloshing in a tank that is nearly full tends to cause the sender to read high. This is because there is limited empty space for the fuel to slosh into, so the level cannot be reduced under the float to any great degree. Wave motion, on the other hand, can lift the sender float to the top of the tank.

This tendency may be compensated for in the circuit of FIG. 3 by setting the preset inputs to the up/down counter 20 between zero and 32 when the tank is over half full. For example, if the tank is nearly full and the preset input to the counter 20 is 10, it takes ten clock pulses in the decrementing mode for counter 20 to underflow and decrement digital counter 22, reducing the signal on bus 32. However, it takes fifty-three clock pulses in the incrementing mode for counter 20 to overflow and increment digital counter 22, increasing the signal on bus 32. This unevenness in what is required to cause an overflow and underflow of counter 20 compensates for the uneven sloshing of the fuel in the tank when the tank is over half full. The proper preset input varies with the level of fuel in the tank and can be easily set by one skilled in the art by simple experimentation with the specific fuel tank.

If the tank is less than half full, the opposite situation as occurs in the previous example is true. Almost any vehicle acceleration causes the fuel to slosh up along the edges of the tank, in turn causing the float to bottom out, indicating a disproportionately low fuel reading. This situation is compensated for by this invention by providing counter 20 with a preset input between 32 and 63 when an overflow or underflow occurs and the tank is less than half full. For example, if the tank is nearly empty and the preset input to the counter 20 is 54, it will take nine clock pulses in the incrementing mode for counter 20 to overflow and increment digital counter 22, increasing the signal on bus 32. However, it will take fifty-four clock pulses in the decrementing mode for counter 20 to underflow and decrement digital counter 22, decreasing the signal on bus 32. This example compensates for the uneven sloshing when the tank is under half full.

Figure 4:
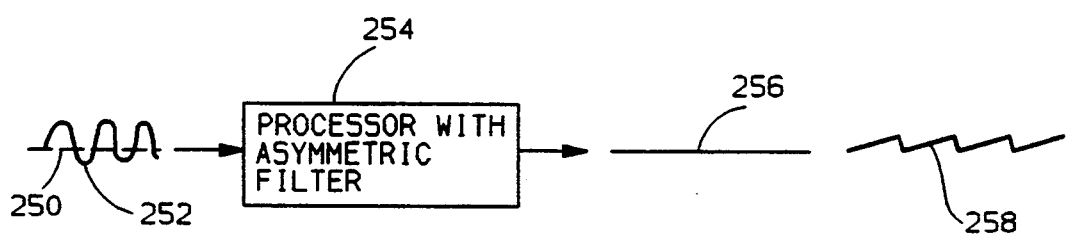
FIGS. 4 and 5 are illustrations of how this invention processes fluctuating signals.
Figure 5:
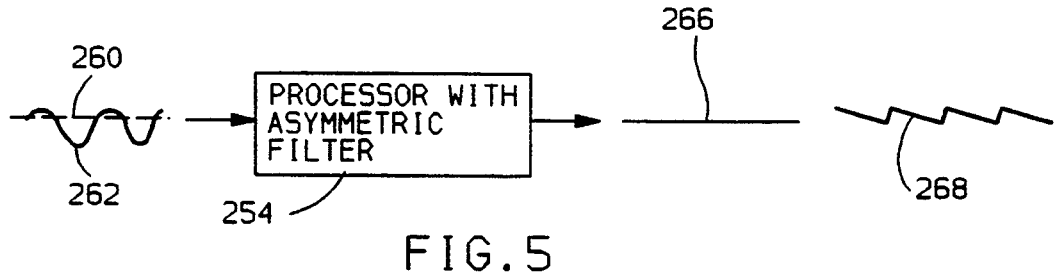

Referring to FIGS. 4 and 5, the effects of the asymmetric filtration of this invention on asymmetric signals can be seen. In FIG. 4, reference numeral 250 designates an at rest sender signal level as the indicated dotted line. The fluctuating sender signal, reference 252, is asymmetric with respect to the at rest level, rising above the at rest level more than dipping below, indicating sloshing in a mostly full fuel tank. Proper asymmetrical filtering by processor 254, representing, for example, the circuit in FIG. 3, results in a steady output signal, represented by numeral 256, despite the asymmetry of the input signal. If the processor does not have a high enough time constant and some fluctuations appear at the output of processor 254, the output signal is substantially symmetrical about the proper value, reflecting substantially none of the asymmetry of the input signal 252 (e.g., output 258). Likewise, in FIG. 5, an input signal 262 is asymmetric about at rest signal 260 so that it falls below at rest signal 260 more than it rises above at rest signal 260, indicating sloshing in a mostly empty fuel tank. Proper asymmetrical filtering by processor 254 results in a steady state output signal 266, or, if some fluctuations are not canceled out by the filter, a symmetrical dampened output signal 268 results.

Through the operation of this invention described in the above examples, this invention provides an asymmetrical filtration of sender data to compensate for uneven sloshing of the fuel tank. Because the desired preset input for the up/down counter 20 varies with the desired asymmetry (which depends upon the level of fuel in the tank), bus 32 containing the display drive signal is connected to the bank input of data preset loader 14. Data preset loader 14 varies the preset inputs for counter 20 on bus 15 in accordance with the fuel level as represented by the signal on bus 32. The data preset loader 14 may either vary the preset inputs continuously with changes in fuel level indicated by bus 32 or may have set preset inputs for specific fuel level ranges. Either method may be easily implemented by one skilled in the art, e.g., as in a ROM look-up table.

Figure 6:
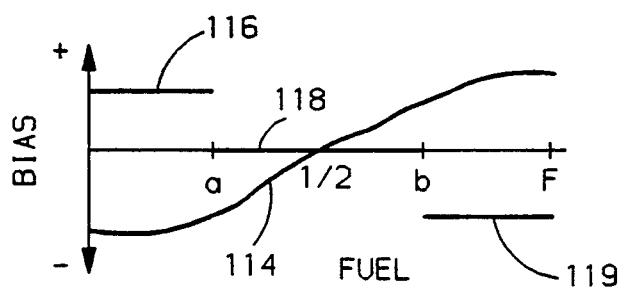
FIG. 6 is graph of slosh bias tendencies for an example fuel tank.

The graph in FIG. 6 illustrates an example bias of fuel tank slosh, trace 114, and an example configuration for data preset loader 14. In the example shown, for fuel levels less than ½ tank, fuel slosh contains a bias so that the average sender signal corresponds to a fuel level less than the actual fuel level. For fuel levels greater than ½ tank, fuel slosh contains a bias so that the average sender signal corresponds to a fuel level greater than the actual fuel level.

Lines 116, 118 and 119 illustrate three preset values, corresponding to three asymmetric configurations for the asymmetric filter. Line 116, for the fuel tank region below point a, represents a high bias for the filter, e.g., a preset value above 32, to compensate for the low fuel slosh bias in that region. Line 118, for the fuel tank region between points a and b, represents a substantially zero bias for the filter, e.g., a preset value of 32, providing no bias compensation. Line 119, for the fuel tank region above point b, represents a low bias for the filter, e.g., a preset value below 32, to compensate for the high fuel slosh bias in that region.

Figure 7:
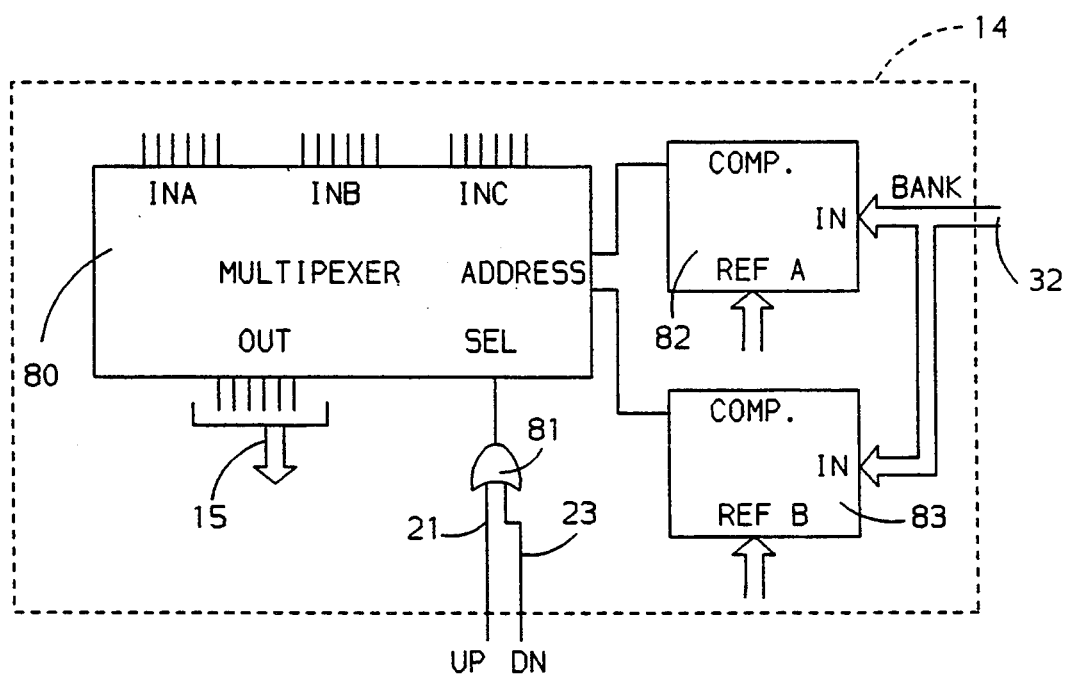
FIG. 7 is a more detailed example implementation of a portion of the circuit shown in FIG. 3.

FIG. 7 represents an example implementation of data preset loader 14 corresponding to the configuration shown in FIG. 6. The data preset loader 14 shown includes digital comparators 82 and 83 and multiplexer 80. Bus 32, connected to the bank input, is connected to the inputs of comparators 82 and 83. The reference inputs to digital comparators 82 and 83 are either hard wired or programmably set to correspond to points a and b in FIG. 6.

When the digital signal on bus 32 is below a signal corresponding to point a, both comparators 82 and 83 output a logic low signal to the address input of multiplexer 80. With the low signals from both comparators at the address input, multiplexer 80 selects the INA input when a select signal is received from line 21 or line 23, via OR gate 81. The digital signal at the INA input represents a high bias value, e.g., 54, which is coupled to the preset input of up down counter 20 via bus 15.

When the digital signal on bus 32 corresponds to a point between points a and b (FIG. 6), comparator 82 outputs a logic high signal and comparator 83 outputs a logic low signal. With these signals from comparators 82 and 83, multiplexer 80 selects the INB input when a select signal is received via OR gate 81. The digital signal at the INB input represents a substantially zero bias for substantially symmetrical filtering, e.g., 32, and is coupled to the preset input of up down counter 20 via bus 15.

When the digital signal on bus 32 corresponds to a point above point b (FIG. 6), both comparators 82 and 83 output logic high signals. With these signals from comparators 82 and 83, multiplexer 80 selects the INC input when a select signal is received via OR gate 81. The digital signal at the INC input represents a low bias value, e.g., 10, which is coupled to the preset input of up down counter 20 via bus 15.

A simple variation on the circuit shown in FIG. 7 is to eliminate the comparators 82 and 83 and connect the two most significant bit lines of bus 32 to the address input of multiplexer 80. With this implementation, however, there is no flexibility of reference points a and b.

The specific preset inputs may vary greatly from implementation to implementation and are affected by fuel tank shape. Additionally, the tank does not necessarily have symmetrical slosh characteristics at the half full level as indicated in the example above. Regardless of the slosh characteristics, they may be easily determined by one skilled in the art through simple experimentation as follows: (1) Fill the tank to a predetermined level; (2) Check the display reading when the vehicle is motionless and the fuel does not slosh; (3) Provide vehicle motion so that the fuel sloshes in the tank and check the display reading with a symmetrical filter; (4) Set the corresponding preset input to the up/down counter 20 in relation to the direction and amount of deviation of the fuel slosh display reading from the display reading when there is no slosh; and (5) Repeat the above steps for different fuel levels.

Figure 8:
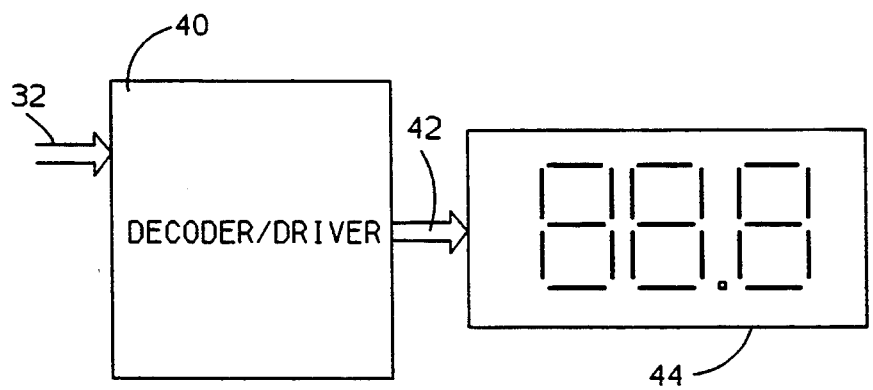
FIGS. 8, 9 and 10 are schematic diagrams showing implementation of this invention with three types of displays.

Referring to FIG. 8, the circuitry set forth in FIG. 3 can be easily implemented to drive digital fuel gauge display 44. For example, output bus 32 is connected to a three digit seven segment decoder/driver circuit 40, which is connected through drive lines 42 to drive the digital display 44. The digital display 44 may be any form of digital display, including LED, liquid crystal, and vacuum fluorescent.

Figure 9:
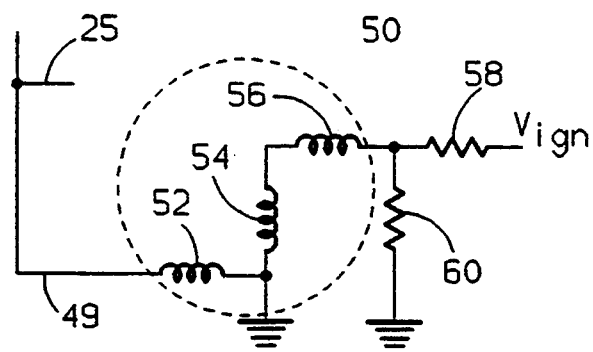

Referring to FIG. 9, instead of bus 32 being used to drive a display, line 49 is connected to line 25, the output of the D/A converter 26. The signal on line 49 is used to drive conventional three-coil air core gauge 50. Air core gauge 50 comprises coils 52, 54, and 56 that, when energized, generate a composite magnetic vector. A magnetic rotor (not shown) of gauge 50 rotates to align its magnetic field with that of the composite magnetic vector, in turn rotating a shaft to which a pointer is attached. The deflection of the pointer along a scale indicates the level of fuel in the tank. Coils 54 and 56 are biased by a voltage at the midpoint of the resistor divider network comprising resistors 58 and 60 and connected between ignition voltage and ground. Coil 52 is energized in relation to the voltage on line 49, resulting in deflection of the gauge pointer (not shown) in relation to the current through coil 52 and the voltage on line 49. The above described gauge example is considered equivalent to any suitable analog gauge which may be driven by the signal on line 49 to indicate fuel level.

Figure 10:
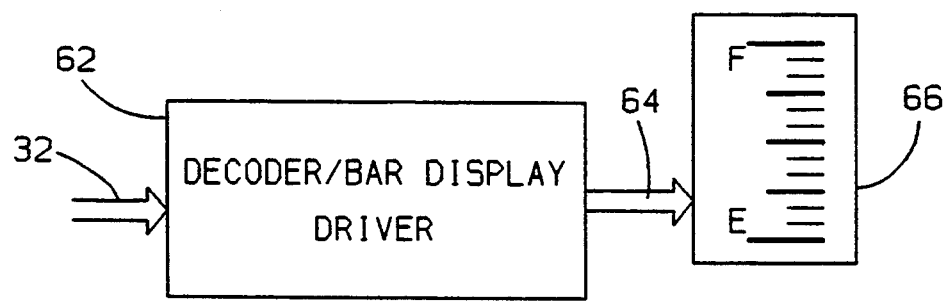

Referring to FIG. 10, an electronic gauge, such as bar gauge 66, may be easily implemented with this invention. The digital output signal on bus 32 is input into decoder/bar display driver 62, which drives multi-segmented bar display 66, through bus 64. The display 66 may be any suitable electronic display such as a vacuum fluorescent, liquid crystal, and LED.

Referring again to the filtration of data provided at the output of comparator 18 (e.g., in FIG. 3), copending patent application Attorney Docket No. G-6698, entitled "Fuel Wobbler," filed concurrently with this specification, assigned to the assignee of this invention, and incorporated into this specification by reference, describes the differences in the magnitude of signal fluctuation when the fuel tank is nearly empty and when the fuel tank is not nearly empty.

In short, the magnitude of the sender fluctuations is not as great when the tank is nearly empty because there is not as much fuel to lift the float when the fuel sloshes. Consequently, a long period filter is not necessary when the tank is nearly empty, and a short period filter has a quicker response in reflecting changes in fuel level. However, switching between a short period filter and a long period filter as a certain level (the trip point) of fuel is reached may cause erratic pointer movements, such as the needle fluctuating loosely below the trip point, and then appear to stick at the trip point, as the long term filter is switched on. The circuit in FIG. 11, also described in the above mentioned copending application, implements this invention with two filters, a short period filter and a long period filter, in a manner that provides smooth and fluid transitions between the short and long term filters.

In the figure, the signal on line 17 is connected to the non-inverting input of comparator 18 and to one input of multiplexer 144. The signal on line 17 is compared, at comparator 18, with the analog output signal of the long period filter 131 on line 140. The long period filter 131 comprises comparator 18, up/down counter 126, data preset loader 124, digital counter 134 and digital to analog converter 136. The output of comparator 18 on line 120 is fed to the up/down counter 126. Up/down counter 126 is identical to up/down counter 20 in FIG. 3, with preset inputs set through bus 122. The up/down counter 126 receives a slow clock pulse on line 123 to achieve a relatively long time constant. Long period filter 131 has a long enough constant to eliminate erratic needle motion due to fuel slosh and the preset inputs, controlled by data preset loader 124 in response to the output of digital counter 134, control the desired asymmetry of the filter.

The signal on line 140 is fed into the multiplexer 138 and output on line 142 if selected. The signal on line 140 is also fed into multiplexer 144, comparator 160 and comparison circuit 162. When the long period filter 131 is selected, multiplexer 138 is selected, through line 168, so that the signal on line 140 is output to line 142, which is used to drive a gauge display device by any of the methods mentioned in this specification, (A/D conversion may be necessary since the signal on line 142 is analog). Also, when the long period filter is selected, the multiplexer 144 is selected so that the signal on line 140 is fed to the short period filter 151 through line 148, so that the short period filter output follows the long period filter output.

Short period filter 151 comprises comparator 128, up/down counter 146, digital counter 154 and digital to analog converter 156. The short period filter receives a relatively fast clock signal from divider 28 via line 125. Up/down counter 146 has a fixed preset for substantially symmetrical filtering, e.g., preset set at 32.

Up/down counter 146 has overflow and underflow outputs at lines 150 and 152, feeding the clock up and clock down inputs of digital counter 154. The short period filter 151 outputs a signal, via D/A converter 156, to line 158. Line 158 is connected to one input of the multiplexer 138, to the inverting input of comparator 128 and to comparison circuit 162.

Comparator 160 is used to determine whether the output of the long period filter is below a preset value, referred to as the trip point, which determines if a short period filter constant is appropriate. When comparator 160 determines that the long period filter output, line 140, is below the trip point, an output signal on line 164 sets flip flop 165 via OR gate 171. Flip flop 165 controls multiplexer 138 so that the signal on line 142 is the signal input from line 158 and controls multiplexer 144 so that the signal on line 17 is fed directly to comparator 128, in the short period filter 151. In this manner, the short period filter supplies the output signal that appears on line 142 when output of the long period filter 131 is below the trip point.

Comparison circuit 162 provides two comparisons. It determines both if the value from the long period filter is greater than trip point plus a predetermined amount, delta, and if the output of the short period filter is within a small range of the long period filter. If both of these conditions are met, the output of comparison circuit 162 causes flip/flop 165 to output a signal on line 168 that controls multiplexer 138 to couple the signal on line 140 to output line 142 and controls multiplexer 144 so that the signal on line 140, not the signal on line 17, is fed to the input of short period filter 151.

Use of comparator 160 and comparison circuit 162 to control which signals are output to line 142 and which signal is input to the short period filter 151 provides a smooth transition between the long period filter and short period filter, preventing needle jumping, and providing hysteresis. The trip point for comparator 160 is set on line 170 through addressable data selector 175, receiving inputs from various taps on resistor chain 174, which is coupled between ground and ignition voltage via load resistor 173. The trip point plus delta reference is set on line 172 through data selector 175 so that the trip point plus delta reference is slightly higher than the trip point reference. Memory 177 feeds, through bus 176, the selection addresses for data selector 175. The memory 177 may be preset during manufacture of the circuit for the specific implementation and the memory 177 is periodically cycled to load the select addresses in a data latch (not shown) in the data selector 175.

Figure 12:
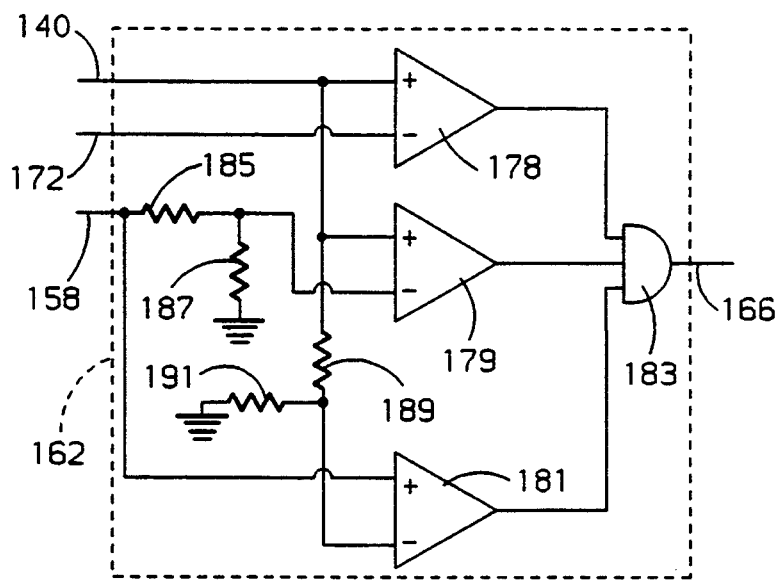
FIG. 12 is a more detailed block diagram of a portion of the circuit illustrated in FIG. 11.

Comparator 160 may be a simple comparator, similar to comparator 18, with input lines 140 and 170. An example implementation of comparison circuit 162 is shown in FIG. 12 and includes comparators 178, 179 and 181. Comparator 178 provides a positive signal to AND gate 183 if the long period filter value on line 140 is greater than the trip point plus delta value on line 172. Comparator 179 sets the upper limit on the allowable deviation of the long period filter signal on line 140 from the short period filter signal on line 158, through use of the resistor divider network comprising resistors 185 and 187. The preferred ratio of resistor 187 to resistor 185 is five to one. Likewise, comparator 181 sets the lower limit on the allowable deviation of the long period filter signal on line 140 from the short period filter signal on line 158, through use of resistor divider network comprising resistors 189 and 191. The preferred ratio of resistor 191 to resistor 189 is five to one. When all three comparators 178, 179 and 181 provide a positive output signal to AND gate 183, a positive signal appears on line 166, toggling flip/flop 165 so that the long period filter output on line 140 is coupled to line 142 and to the input of short period filter 151.

Figure 11:
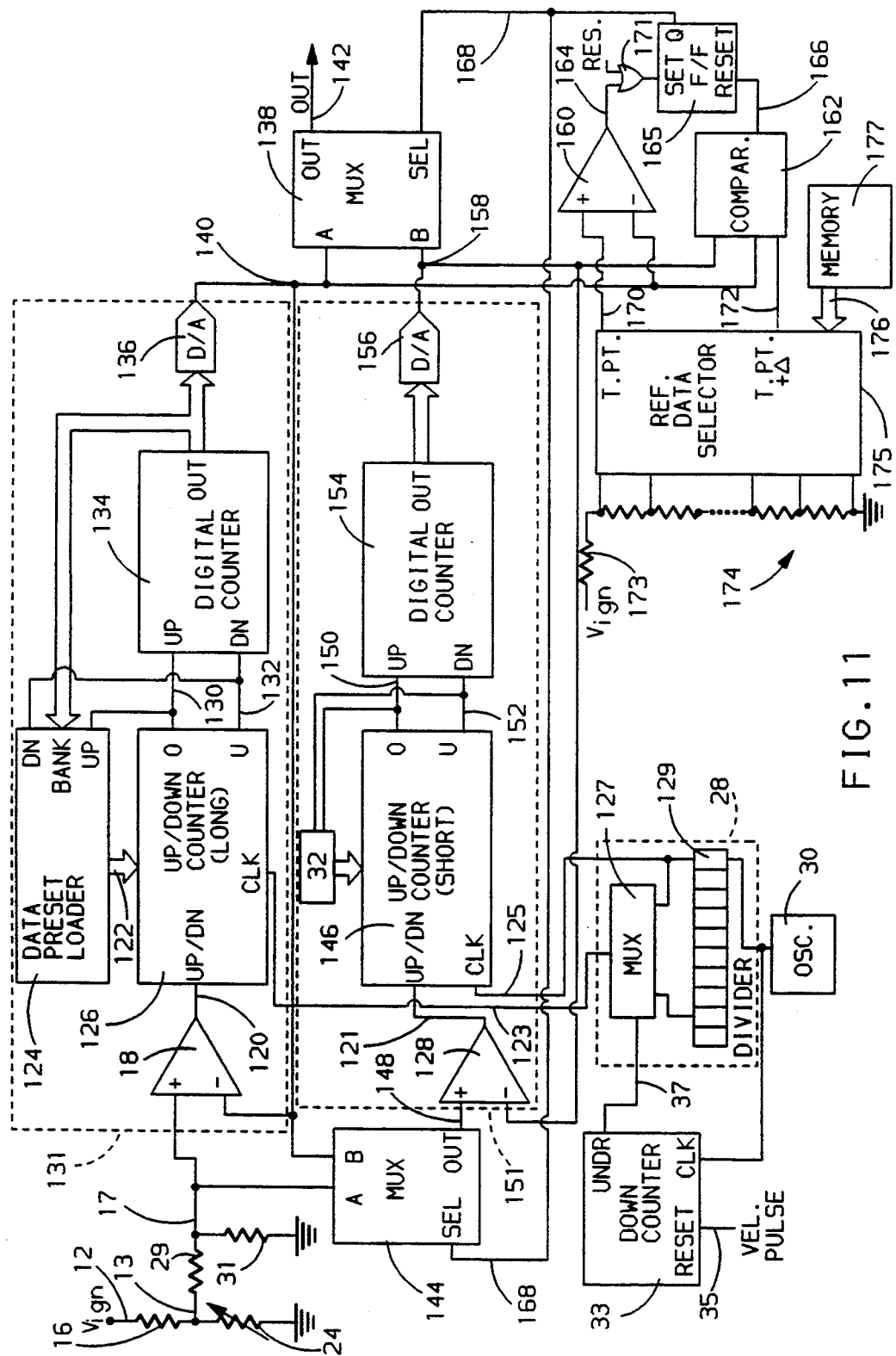
FIG. 11 is an illustration of an implementation of this invention that selects between a long period and a short period filter.

The circuit in FIG. 11 also has a feature that speeds up the filter when the vehicle is not moving, since heavy filtration is not needed unless the vehicle is moving, causing the tank to slosh. A velocity signal in the form of pulses is provided on line 35 from a standard vehicle velocity sensor. Pulses appear on line 35 in accordance with rotation of a member of the vehicle drive train, indicating vehicle motion, e.g., 4000 pulses per mile. Each pulse resets down counter 33 to a predetermined start value. When down counter 33 ceases to receive pulses on line 35, it counts down to zero, after a period of time, e.g., 30 seconds, with pulses from oscillator 30, and outputs a signal at the underflow output, line 37, to multiplexer 127 in clock divider 28. When multiplexer 127 receives the underflow signal on line 37, it bypasses several of the dividers, increasing the frequency of the clock signal to line 123, which clocks up/down counter 126, reducing the time constants of the long period filter 131. In this manner, if the fuel tank is filled when the vehicle is at rest, the output signal quickly achieves the value indicating the new fuel level. Once the vehicle starts moving again, and a signal is provided on line 35, operation of the circuit at the normal clock rate continues.

At start-up, a signal is placed on the second input to OR gate 171, to toggle flip/flop 165 so that the short period filter is activated.

Use of this invention with the circuits shown in FIGS. 11 and 12 provides asymmetric filtering and long and short period filtering of the sender data, improving the quality of displayed information.

Figure 13:
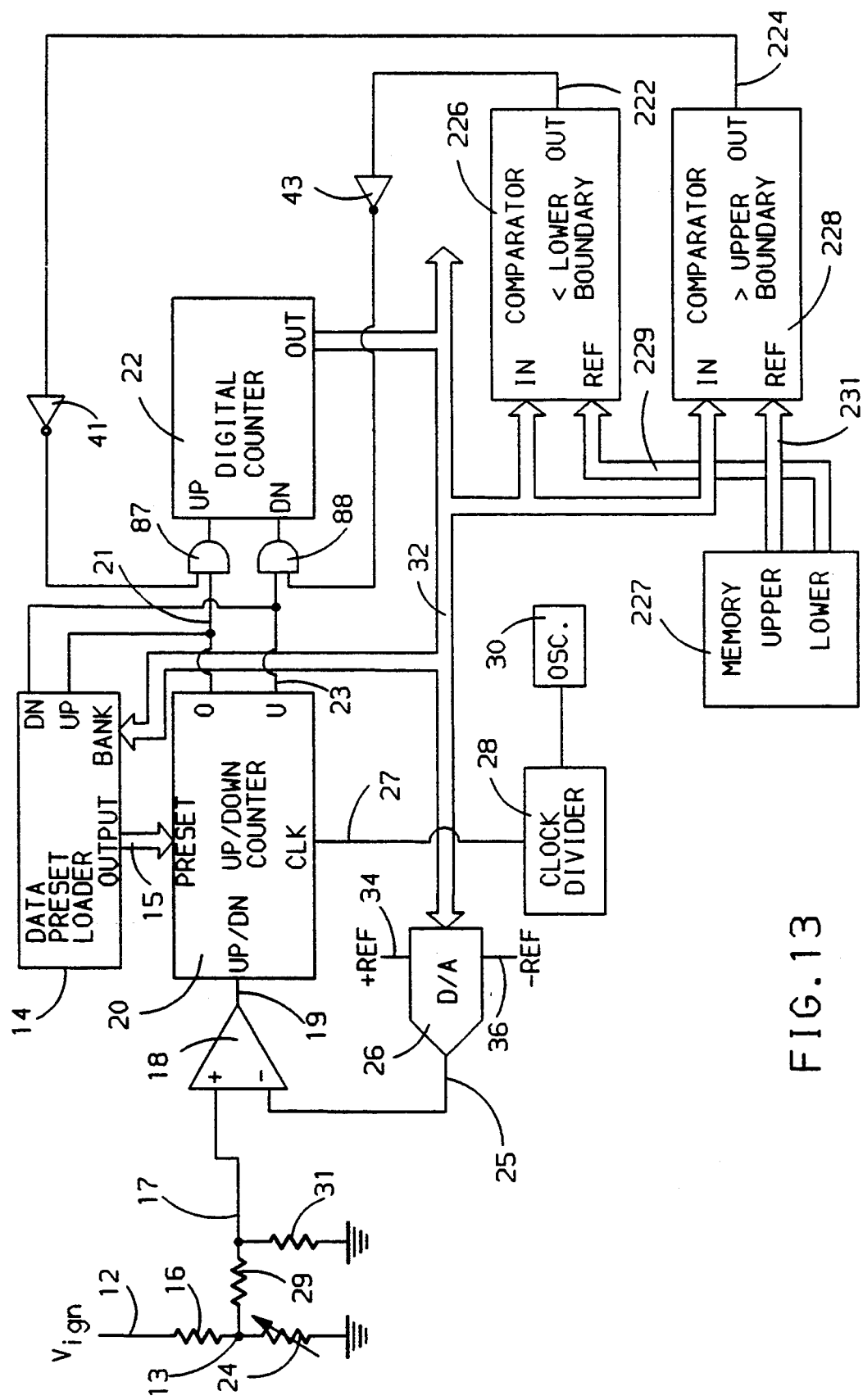
FIG. 13 is an illustration of an implementation of this invention also including upper and lower limitations on the output signal.
Figure 15A:
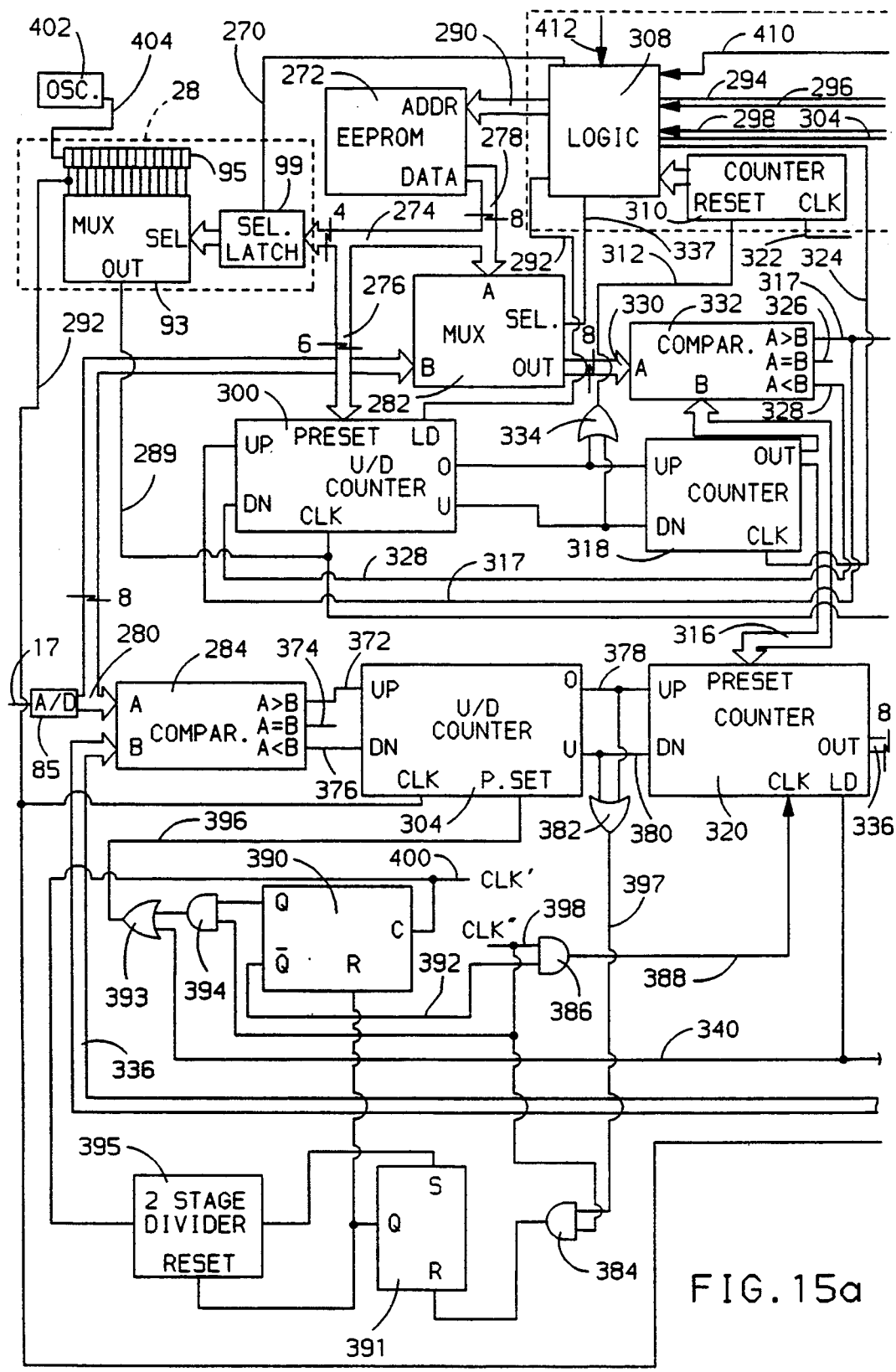
Figure 15B:
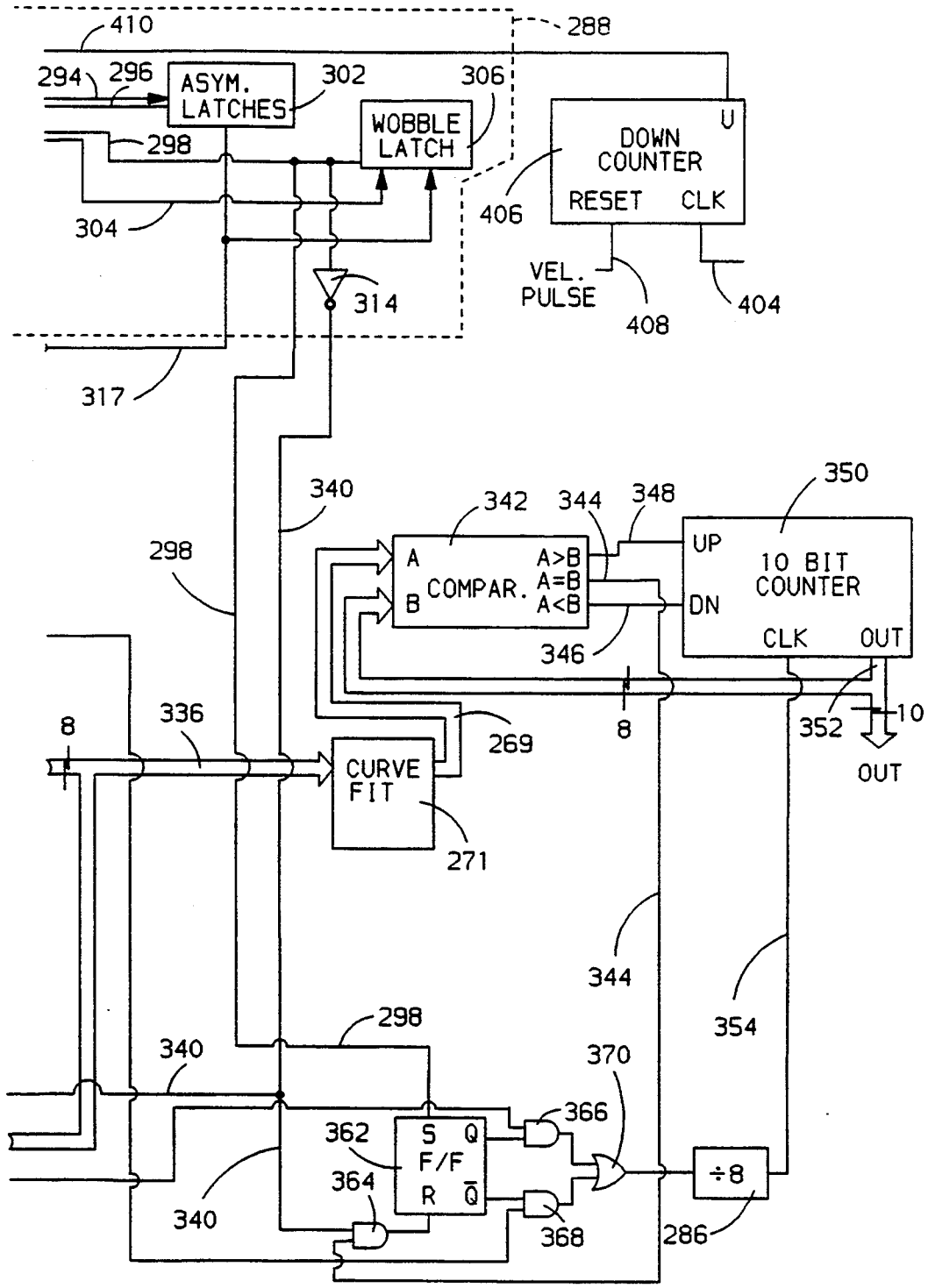

Referring to FIG. 13, it may be desirable for the signal on bus 32, which is used directly or indirectly to drive a display, to be limited to values within the range of the scale, e.g., eliminating values indicating less than empty and eliminating values indicating the tank is more than full. The circuit in FIG. 13 is similar to the circuitry in FIG. 3 with the addition of digital comparators 226 and 228, memory 227, inverters 41 and 43.

Comparator 226 compares the output signal on bus 32 to a signal programmed into memory 227, coupled to comparator 226 through bus 229, as the minimum desired output signal. The minimum desired output signal for example, corresponds to a signal driving a display to read on "empty." Likewise, the maximum desired output signal, also programmed into memory 227, corresponds, for example, to a signal driving a display to read "full" and is coupled to comparator 228 through bus 231. If the signal on bus 32 is less than the minimum desired output signal, then a logic 1 output signal is provided on line 222. If the signal on bus 32 is less than the minimum desired signal, then it is by definition, also less than the maximum desired signal and the corresponding output from comparator 228 on line 224 is logic 0.

The logic 1 on line 222 is inverted by inverter 43 to a logic 0 and input to AND gate 88. With the logic 0 at the one input of AND gate 88, counter 22 cannot count down further, preventing the output signal on bus 32 from falling below a signal corresponding to "empty."

If the signal on bus 32 is greater than the maximum desired output signal, e.g., a signal corresponding to "full," then comparator 228 outputs a logic 1 signal on line 224. The logic 1 signal on line 224 is inverted by inverter 210, feeding a logic 0 signal to one input of AND gate 87. With the logic 0 signal at one input of AND gate 87, counter 22 cannot count up further, preventing the output signal on bus 32 from rising above a signal corresponding to "full."

When the output signals of comparators 226 and 228 on lines 222 and 224 are both logic 0, the outputs of inverters 41 and 43 are both logic 1, enabling counter 22 to count both up and down.

Figure 14:
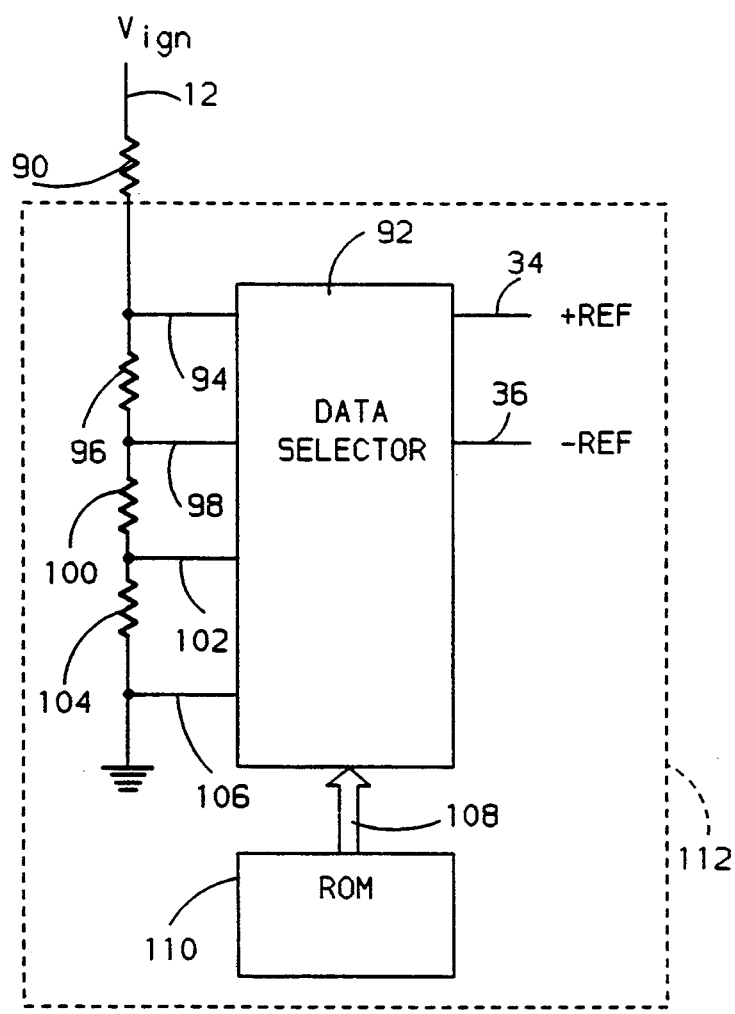
FIG. 14 illustrates circuitry for use with this invention to reduce the effects on the processing circuitry of variations in the voltage level of the vehicle power supply.

The improvement shown in FIG. 14 relates to insulating the circuits set forth herein from the variations in power supply voltage characteristic of vehicle power supply lines. Conventionally, A/D converters and D/A converters, such as the type used in FIGS. 3, 11, 13 and 15 (described below) are referenced to regulated power supplies to ensure that there is only one output for every input signal. However, if the sender signal, e.g., line 17 in FIG. 3, varies with the vehicle power supply, the output signal on bus 32 may vary. To prevent this, normally, line 12 would be fed from a regulated power supply, which is an expensive fix. Additionally, each A/D and D/A converter would have its own regulated supply because each may have different upper and lower references, adding to the expense of the system. The circuitry in FIG. 14 eliminates the need for regulated power supplies for line 12 and the D/A and A/D converters, and is the subject of copending patent application Attorney Docket No. G-6699, entitled "Maintaining Ratiometric Data in Electronically Manipulated Signal Processing Systems," filed concurrently with this specification, assigned to the assignee of this invention, and incorporated into this specification by reference.

The circuitry in FIG. 14 allows the positive and negative references of the A/D and D/A converters used to process signal data to vary in proportion to the variations in the vehicle supply voltage, and to the variations in sender signal on line 17 due to variations in the vehicle supply voltage. With the references varying in proportion to vehicle supply voltage, the outputs of the D/A and A/D converters are substantially insulated from power supply variations. The circuitry in FIG. 14 also allows the range of A/D conversion to be set, to maximize the achievable resolution of the system.

For example, referring to D/A converter 26 in FIG. 3, the positive reference line 34 and the negative reference line 36 are connected to addressable data selector 92 (FIG. 14). Addressable data selector 92 has inputs connected to various taps, 94, 98, 102, and 106, of a resistor chain comprising resistors 96, 100 and 104, coupled between load resistor 90 and ground. Load resistor 90 is connected to line 12, the same vehicle power supply line coupled to sender 24 via resistor 16. Addresses programmed into memory 110 selectively couple lines 34 and 36 to different taps in the resistor chain.

This circuitry provides not only for programmable referencing of D/A converter 26, but also maintains the references of the D/A converter 26 in a fixed ratio with respect to vehicle supply voltage, providing substantial insulation of the system from voltage variations. Preferably all of the D/A converters and A/D converters are referenced in the same manner as converter 26. Converters 136 and 156 (FIG. 11) are preferably likewise referenced in the above-described manner.

Referring to FIGS. 15 and 16, in a preferred implementation of the invention, a state machine 288 is used together with memory 272 to control the circuit and multiplex certain data functions in a manner that may provide savings in silicon area for circuit integration.

The signal on line 17 is converted to a digital data signal by analog to digital converter 85 and provided on eight bit bus 280. Bus 280 provides the digital data signal to the A input of comparator 284 for short period filtering and to multiplexer 282, which is normally selected through line 337 so that the data signal on bus 280 is coupled to bus 330, which is in turn connected to the A input of comparator 332 for long period filtering. The B input of comparator 284 is coupled to bus 336, the output bus of counter 320 in the short period filter and the B input of comparator 332 is coupled to bus 316, the output bus of counter 318 in the long period filter.

Both comparators 284 and 332 have three output lines, an A>B line (372 and 317), and A=B line (374 and 326) and an A<B line (376 and 328), on which output signals respectively occur when the A and B input signals follow the corresponding logic functions. For comparator 332, the A>B line 317 and A<B line 328 are connected to the up and down inputs of up/down counter 300. Likewise, for comparator 284, the A>B line 372 and the A<B line 376 are connected to the up and down inputs of up/down counter 304.

The state machine 288 comprising logic 308, asymmetry latches 302, wobble latch 306 and counter 310 controls the operation of the long period filter and the wobble mode, i.e., whether or not the short period filter is activated. The up/down counter 300 receives a slow clock signal through line 289 and up/down counter 300 counts up and/or down in response to the signals on output lines 317 and 328 of comparator 332 until an overflow or underflow condition occurs. When an overflow or underflow condition occurs, a signal is provided via OR gate 334 and line 312 to counter 310 of state machine 288, which starts a cycle of the state machine.

When the state machine 288 cycles, it cycles through a series of states, controlled by counter 310. In the first state, State 0, a pulse signal is provided on line 324 to counter 318, clocking counter 318 one count up or one count down in accordance with whether up/down counter 300 is overflowing or underflowing.

State machine 288 then cycles to State 1, during which state logic circuitry 308 provides a word on bus 290, addressing memory 272 to provide a word on bus 278 representing the break point between the first and second asymmetry regions of the circuit, e.g., point a, FIG. 6. Also in State 1, a signal is provided on line 337 selecting the A input to multiplexer 282, which is connected to bus 278, the data output bus for memory 272. The signal on line 337 maintains this value until the state machine returns to State 0. A comparison is made by comparator 332 between break point a and the output of counter 318 on bus 316. A signal on line 317 that is logic 1 if the signal on bus 316 is less than point a and logic 0 if the signal on bus 316 is greater than point a is latched into asymmetry latches 302.

During the next state, State 2, logic circuitry 308 provides a word on bus 290, addressing memory 272, which provides a word on bus 278 representing break point b, FIG. 6, between the second and third asymmetry regions. Comparator 332 compares point b and the output of counter 318 on bus 316. The comparison result on line 317 is latched into asymmetry latches 302.

During State 3, an address word on bus 290 addresses a time constant from memory 272. The time constant is determined in response to the whether there is an initialization signal on line 412, e.g., from an initialization timer, and in response to a signal on line 410 from down counter 406 (similar to down counter 37 in FIG. 11). The time constant also varies in response to the asymmetry range of the output signal on bus 316, as determined by asymmetry latches 302. The time constant is provided on bus 274, comprising four lines of bus 278, to the input of latch 99 in divider 28, and is latched into latch 99 with a signal on line 270 from logic circuitry 308. The output of latch 99 controls multiplexer 93, which couples one of the outputs of the series of fourteen dividers 95 to line 289.

The clock signal on line 289 is generally as follows. During initialization and when the vehicle is not moving (as determined by counter 406), the signal on line 289 is as fast as the fast clock signal on line 292. Otherwise, the signal on line 289 is relatively slow compared to the signal on line 292. Three possible slow clock frequencies are provided, one for every region of asymmetry (FIG. 6) as determined by asymmetry latches 302, e.g., in one example with lower clock frequencies corresponding to higher levels of fuel in the tank.

During State 4, a word is provided on bus 290, responsive to asymmetry latches 302, addressing memory 272 to provide the proper asymmetry preset on bus 276, comprising six of the lines of bus 278. A load signal is provided on line 292, triggering counter 300 to load the asymmetry preset on bus 276 to the preset input of up/down counter 300.

During State 5, a word responsive to wobble latch 306 is provided on bus 290 to address from memory 272 the wobble trip point, which is provided on bus 278 and coupled to the A input of comparator 332. The A>B output line 317 of comparator 332 is coupled to the wobble latch 306, which latches in a determination of whether the output of counter 318 on bus 316 is above or below the wobble point. If the wobble latch 306 indicated, before the comparison, that the short period filter was inactive (indicating that the fuel level was above the wobble trip point), then the wobble trip point addressed equals the value "trip point". If the wobble latch 306 indicated, before the comparison, that the short period filter was active, then the wobble trip point addressed equals the value "trip point plus delta."

During the next state, the counter 310 is reset, resetting the state machine 288, and bringing line 337 high again so that the signal on bus 280 is again coupled to comparator 332.

In the state machine 288, wobble latch 306 controls through lines 298 and 340 whether the short period filter is enabled. When the short period filter is not enabled, line 340 provides a command to the load input of counter 320. In response to the load command, counter 320 forces its output, connected to bus 336, to a value equal to its preset input, which is coupled to bus 316, the output of the long period filter. In this manner, output bus 336 carries the output signal of the long period filter when the short period filter is not activated.

When wobble latch 306 determines that the short period filter is activated, counter 320 is responsive to up/down counter 304 and not bus 316. The short period filter operates as follows. Comparator 284 compares the signal on bus 280 to the filter output on bus 336. In response to the comparison results on lines 372 and 376, up/down counter 304 counts either up or down with the fast clock signal on line 292.

When counter 304 underflows or overflows, the circuitry including AND gates 384, 386 and 394, OR gate 393 and flip flops 390 and 391 comprise a second state machine for controlling the short period filter. The second state machine has only two states. In State 0, counter 320 is clocked once up or once down in accordance with the signals on line 378 and 380. In state 1, counter 304 is loaded with a hard wired preset value of 32, so that the short period filter filters symmetrically. The short period filter may be made asymmetrical if a designer so desires, but such is not the preferred embodiment. The second state machine is reset by a signal output from two stage divider 395 to the set input of flip flop 391 and the circuitry then waits for another overflow or underflow signal from up/down counter 304. While both lines 378 and 380 are low, clock signals on line 388 do not affect counter 320.

Referring to FIG. 16, an example implementation of state machine 288 is shown. The circuit shown is an example implementation and any circuitry that performs the necessary equivalent control functions my be used. In the state machine, counter 310 comprises three flip flops 311 that cycle the state machine 288 through the states at a rate determined by a first clock signal on line 400. The output of counter 310 controls the data output of logic circuit 308, comprising decoding gates 315, command gates 319 and word gates 321.

The asymmetry latches 302 comprise two latches 313, each storing one of the results of the two comparisons made during State 1 and State 2 of state machine 288. Wobble latch 306 comprises two latches 323.

In short, state machine 288 controls the outputs of gates 327–335 and gate 339. During State 0, gate 327 provides the output signal on line 337 that controls multiplexer 282. With a clock signal from line 398, gate 341 provides the command on line 324 to clock counter 318. During State 1, gates 329 and 343 provide the clock command for the first latch 313 to latch in the first asymmetry region comparison result. During State 2, gates 331 and 345 provide the clock command for the second latch 313 to latch in the second asymmetry region comparison result. During State 3, gates 333 and 347 provide the command on line 270 commanding divider 28 to latch into latch 99 the time constant. During State 4, gates 335 and 349 provide the signal on line 292 commanding up/down counter 300 to load the preset value. During State 5, gates 339, 351 and 353 provide the signal controlling the wobble latch 306, which outputs the signal on line 298 controlling whether the short period filter is activated. In the last state, the counter 310 is reset to State 0 and held there waiting for a reset command from line 312 through gate 355 and flip flop 357. The remaining gates 321 provide part of the word output on bus 290 via address encoder 291, which is easily implemented by one skilled in the art.

Referring again to FIG. 15, the output bus 336, connected to the output of counter 320, carries the filter output signal. For reasons set forth below with reference to FIGS. 17–21, a curve fitter 271 may be implemented in the circuitry. The details of the curve fitter 271 will also be described below with reference to FIGS. 17–21.

The output of curve fitter 271 on bus 269 is coupled to the glider circuit comprising comparator 342, flip/flop 362 and ten bit counter 350, which function to increase the apparent resolution of the output signal. The "glider" circuit is the subject of the above mentioned copending patent application, Attorney Docket No. G-8966.

When wobble latch 306 indicates selection of the short period filter, a logic high signal is output on line 298. The signal on line 298 sets flip/flop 362, which outputs a logic high signal to one input of AND gate 366. When flip/flop 362 is set, the fast clock signal on line 292 is coupled, via AND gate 366 and OR gate 370 to a three stage divider 286, which divides the clock signal by eight and clocks counter 350 with the resultant signal. Counter 350 counts at one eighth the clock rate of the signal on line 292, either up or down in accordance with the signals on lines 348 and 346. A count down signal on line 346 occurs when the signal on bus 269 is less than the eight most significant bits of the output of counter 350 on bus 352 and a count up signal on line 348 occurs when the signal on bus 269 is greater than the eight most significant bits of the signal on bus 352.

When wobble latch 306 selects the long period filter, line 340 goes high, providing a logic high signal to one input of AND gate 364. A clock frequency of one eighth of the fast clock signal on line 292, however, remains coupled to the clock input of counter 350 until a signal on line 344 indicates that the output of counter 350 equals (to eight significant bits) the signal on line 269, which corresponds to the value on bus 316 since counter 320 is loading the output bus 336 from bus 316 at the preset input. When the signal occurs on line 344, AND gate 364 outputs a logic high signal that resets flip/flop 362. When flip/flop 362 is reset, the slow clock signal on line 289 is coupled via AND gate 368 and OR gate 370 to three stage divider 286, and a signal with one eighth the frequency of the clock signal on line 289 results on line 354, the clock input of counter 350. In this manner, if the vehicle fuel tank is being filled with fuel, the counter 350 will not switch to the slow clock signal until the output on bus 352 (and the display) matches the actual fuel level, as indicated on bus 269.

The output of counter 350 is a ten bit digital signal. However, only the eight most significant bits are connected to the B input of comparator 342. The ten bit signal on bus 352 provides an apparent resolution four times greater than that of the signal on bus 269, providing more continuous appearing transitions of an analog gauge display. The net result is that when the signal on bus 269 increases or decreases by one, counter 350 counts up or down respectively by four, thereby achieving increased apparent resolution.

The resultant signal on bus 352 may either be connected directly to a digital display driver or converter to an analog signal by a digital to analog signal converter and used to drive an analog gauge.

Often, fuel gauge systems are very nonlinear. The result of this nonlinearity may be noticed by many vehicle operators during a period of driving when, for example, the fuel gauge takes a long time go from "full" to "¾ full," but appears to go from "¾ full" to "empty" faster. This nonlinearity may be due to several factors, including nonlinearity in the sender 24 (FIG. 3), irregularity in the shape of the fuel tank, location of the senders, and nonlinearity in the analog gauge 50 (FIG. 9). All of these factors may add up to a total system nonlinearity.

Figure 17:
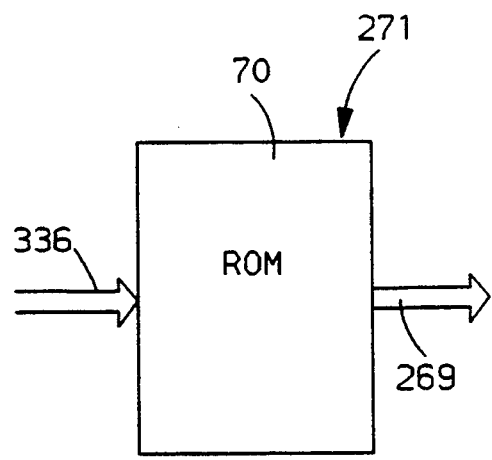
FIG. 17 is an example block diagram of circuitry for use with this invention to compensate for sender and gauge nonlinearities.

To compensate for system nonlinearities, a curve fitter 271, such as in the examples set forth in FIGS. 17 and 19–21, may be used. Referring to FIG. 17, a simple curve fitting process may be implemented using ROM 70. The digital output signal on bus 336 is coupled to the address inputs of ROM 70. At each address in ROM 70, actual fuel level corresponding to the digital signal accessing that address is stored, and output on bus 269 when selected. The relation between the input address and the output signals of ROM 70 may correspond to points along a curve, such as curve 214 in FIG. 18. The signal on bus 269 (FIG. 17) is used to drive a display linearly.

As an alternative to ROM 70, an electrically alterable permanent memory (EAPM) may be used so that one common circuit may be built, but custom programmed for implementation into different systems.

The circuitry implemented to compensate for system nonlinearities need not be the ROM look-up table illustrated in FIG. 17. To reduce memory requirements and programming time, a second method for compensating for system nonlinearity is set forth in FIGS. 19–21, and also described in related copending patent application Attorney Docket No. G-6700, entitled "Electronic Gauge Transform," filed concurrently with this specification, assigned to the assignee of this invention, and incorporated into this specification by reference. In this method, certain key calibration points (210, 212, 216, 218, and 220, FIG. 18) of curve 214 are programmed into memory and the mapping between those points is interpolated. The input data range is divided into a small number of regions corresponding to the calibration points 210, 212, 216, 218 and 220. Each region has a slope value associated with it. Referring again to FIGS. 19–21, the slope value is incrementally added in an accumulator 265 to produce an input to output mapping which is a piece-wise linear approximation to an ideal mapping transform.

More particularly, the digital output signal on bus 336 is coupled to one side of digital comparator 180. The other input of comparator 180 is fed from the output of counter 188, which has the same digital precision as the signal on bus 336. At the initiation of the conversion process, which occurs with every change in the output bus 336, counter 188 is reset to zero and accumulator 265 is cleared to zero. Latch 251 is loaded with zero value. A signal on bus 196 addresses memory 272 to load the offset point 210 in FIG. 18 into data bus 278, provided to the A input of comparator 186. Counter 188 is clocked until the output on bus 190 equals the value of point 210 in comparator 186.

Figure 18:
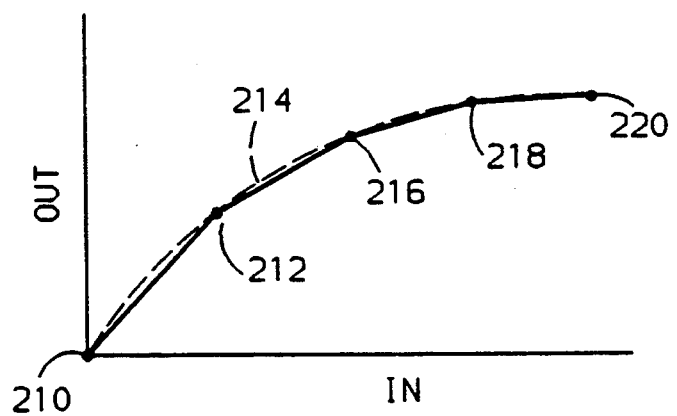
FIG. 18 illustrates a sample transfer function for compensation of system nonlinearities.

When comparator 186 indicates that the output of counter 188 is equal to point 210, latch 251 is loaded with the first slope value from memory 272 and then bus 278 at the A input to comparator 186 is loaded with the value of the first break point 212 (FIG. 18). The first slope value is the slope of the line connecting points 210 and 212 (FIG. 18). Line 198 then clocks the counter 188 until the value on bus 190 is equal to the value of point 212 or the value on bus 336. With each clock of the counter 188, the slope measurement value in latch 251 is added to the value in latch 255, the accumulated value. The adding is performed by adder 259, and the result gets latched into accumulator 265.

Once point 212 is reached by counter 188, the next slope increment, of the line between points 212 and 216 (FIG. 18) is latched into latch 251 and the value of point 216 is provided to the A input of comparator 186. The same accumulation process continues until counter 188 reaches either point 216 or the value on bus 336. If the value of counter 188 does not reach the value on bus 336 before it reaches point 216, then the next slope value is latched into latch 251 and the next point 218 (FIG. 18) is provided to the A input of comparator 186. Again, the accumulation process continues until the output value of counter 188 reaches either point 218 or the value on bus 336. Once point 218 is reached, the slope value for the line connecting points 218 and 220 is loaded into latch 251 and point 220 is provided to the A input of comparator 186. Again the accumulation process continues until the output value of counter 188 reaches either point 220 or the value on bus 336.

When point 220 is reached, the process ends and the value in output bus 267 of accumulator 265, indicating a full fuel tank, is latched into output latch 182, which has an output connected to bus 269. If at any time during the above process, the value on bus 190 is equal to the value on bus 336, comparator 180 outputs a signal on line 192, which ends the cycling of the circuit and the signal on line 198 latches the value in accumulator 265 into output latch 182. In this manner, the curve fitter 271 performs a function on the signal on bus 336 which is a piece-wise linear approximation of the ideal transfer function, e.g., curve 214, FIG. 18, for compensating for nonlinearities in the system.

Figure 19:
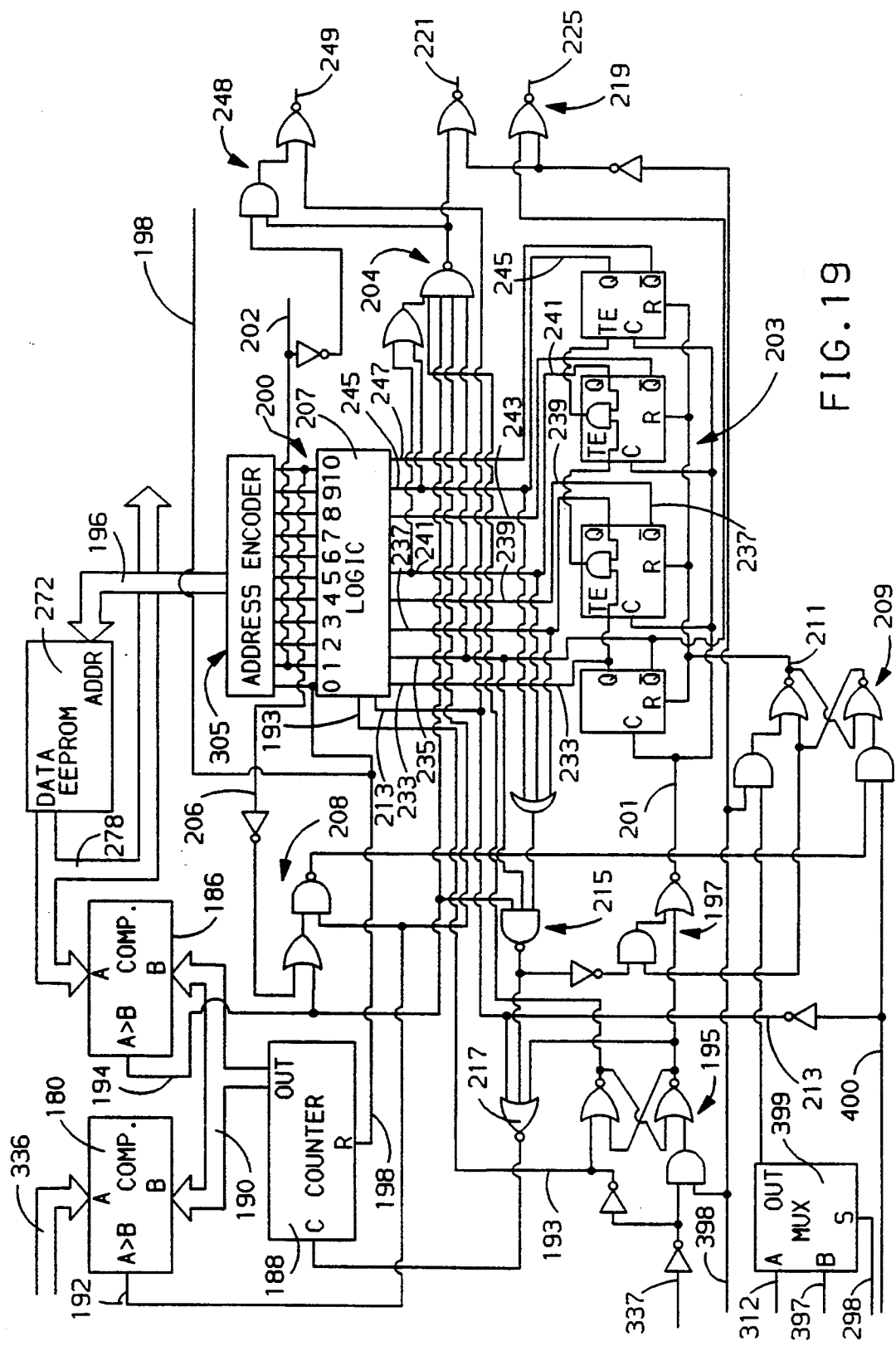
FIGS. 19 through 21 comprise a second example diagram of circuitry for use with this invention to compensate for sender and gauge nonlinearities.
Figure 20:
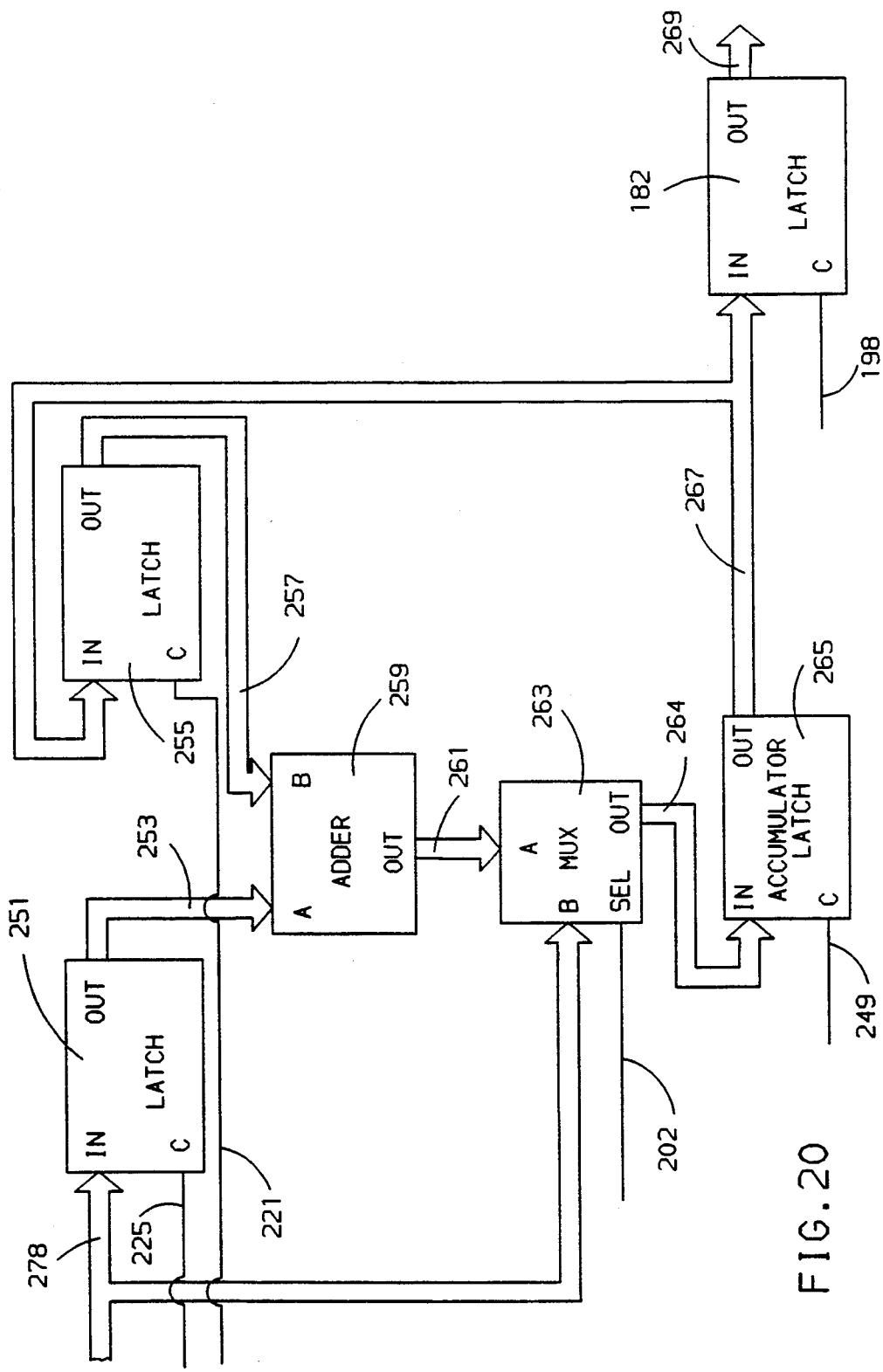
Figure 21:
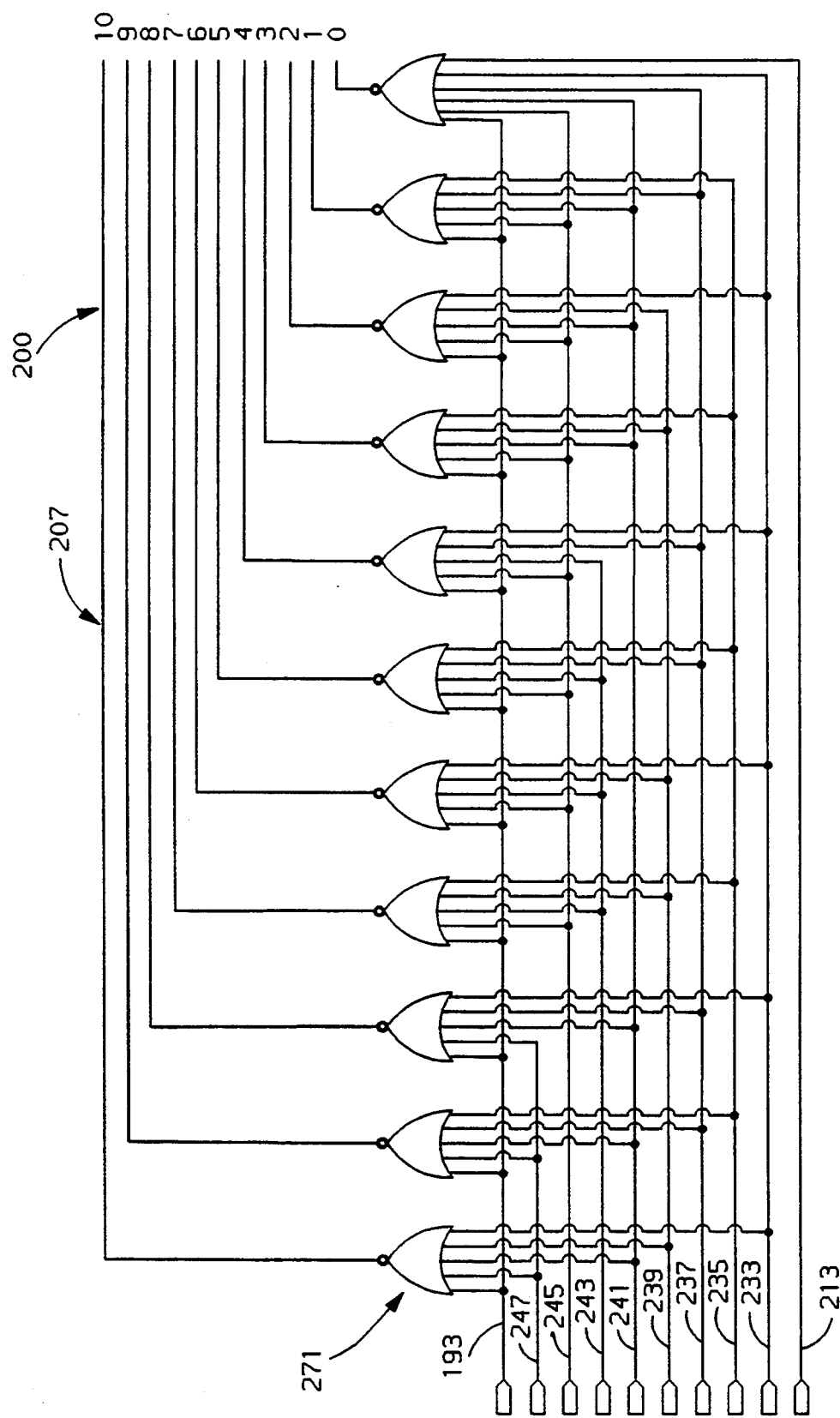

The curve fitter shown in FIGS. 19–21 is controlled by counter 203, logic circuitry 207 and the shown gates. The curve fitter shown is triggered by a signal on either line 312 or line 397, indicating a change in output bus 336. Lines 312 and 397 are selected via multiplexer 399 which is controlled by the signal on line 298. When these signals occur, gates 209 provide a reset signal on line 211 which resets counter 203. Counter 203 is enabled by the signal on line 337 and clocked with the signal on line 398 via gates 195 and 197, which provide the resultant clock signal on line 201.

Output lines 235, 237, 241, and 245 of counter 203 are coupled to gates 215, which are coupled to gate 217, and the clock input of counter 188. Logic circuitry 207, shown in detail in FIG. 21, counter 203 and gates 204, 219 and 248 control the functions of the circuit which performs the piece-wise linear transform by cycling through eleven states, States 0–10. The logic circuitry 207 comprises a series of eleven NOR gates which select the states in response to the output lines of counter 203 and line 193. Address encoder 305 provides the necessary address commands on bus 196 in response to lines 200 output from logic circuitry 207. Address encoders of the type used here are easily implemented by those skilled in the art.

In State 0, counter 188 is reset through a command on line 198, memory 272 is addressed by bus 196 to a location in which the output is zero, multiplexer 263 is selected through a command on line 202 so that the data on bus 278 is coupled to accumulator 265, and accumulator 265 and latch 251 are commanded through lines 249 and 225 to load the zero value from bus 278. In this manner, the accumulator is cleared.

In State 1, a word on bus 196 addresses memory 272 to provide on bus 278 the minimum output value for the circuit, which is coupled via multiplexer 263 to accumulator 265, and latched in with a command on line 249.

In State 2, a word on bus 196 addresses memory 272 to provide the value of point 210 (FIG. 18) on bus 278. Counter 188 is then counted until the output on bus 190 reaches the value of point 210. Multiplexer 263 is selected through line 202 so that the output of adder 259, on bus 261, is coupled to accumulator 265 through bus 264. If at any point during this state, the value on counter 188 is greater than the signal on bus 336, then the cycle is terminated and the value of point 210 in accumulator 265 is loaded into output latch 182.

In State 3, bus 196 addresses in memory the slope of the line between points 210 and 212 and a signal on line 225 loads the slope value into latch 251.

In State 4, bus 196 addresses in memory the value of point 212, which is provided to the A input of comparator 186 via bus 278. Counter 188 is then counted up by clock pulses on the clock input until either point 212 is reached or the value on bus 336 is reached. During this time latch 255 and accumulator 265 are cycled, so that the accumulator output in bus 267 increments by the slope value in latch 251 with each count of counter 188.

If the value on bus 336 is reached by the counter 188, the cycle is terminated by the signal on line 192, which resets counter 203 and brings the signal on line 198 high, which in turn latches in the result on the output bus 267 of accumulator 265 to latch 182. If the point 212 is reached, the circuit continues to State 5.

State 5 is similar to State 3, except the slope value for the line between points 212 and 216 is loaded into latch 251. State 6 is similar to State 4, with the point 216 provided to the A input of comparator 186 via bus 278. States 7 and 9 are similar to States 5 and 3, with the slope values for the lines between points 216 and 218 and between points 218 and 220 loaded into latch 251. Likewise, States 8 and 10 are similar to States 4 and 6, with points 218 and 220 loaded onto bus 278 and provided to the A input of comparator 186.

If the cycle is not terminated at any point during States 2, 4, 6, 8 or 10 due to a signal on line 192 indicating the output of counter 188 being equal to the value on bus 336, then at the conclusion of State 10, counter 203 is reset and the value for the point 220 is latched into the output latch 182 with a signal on line 198.

The result in the latch 182 may be used to drive any of a variety of types of displays, including the examples set forth above, and may require a digital to analog converter. In certain circumstances, a display driver, comprising a simple unity gain amplifier, may be desirable for impedance matching purposes.

Figure 22:
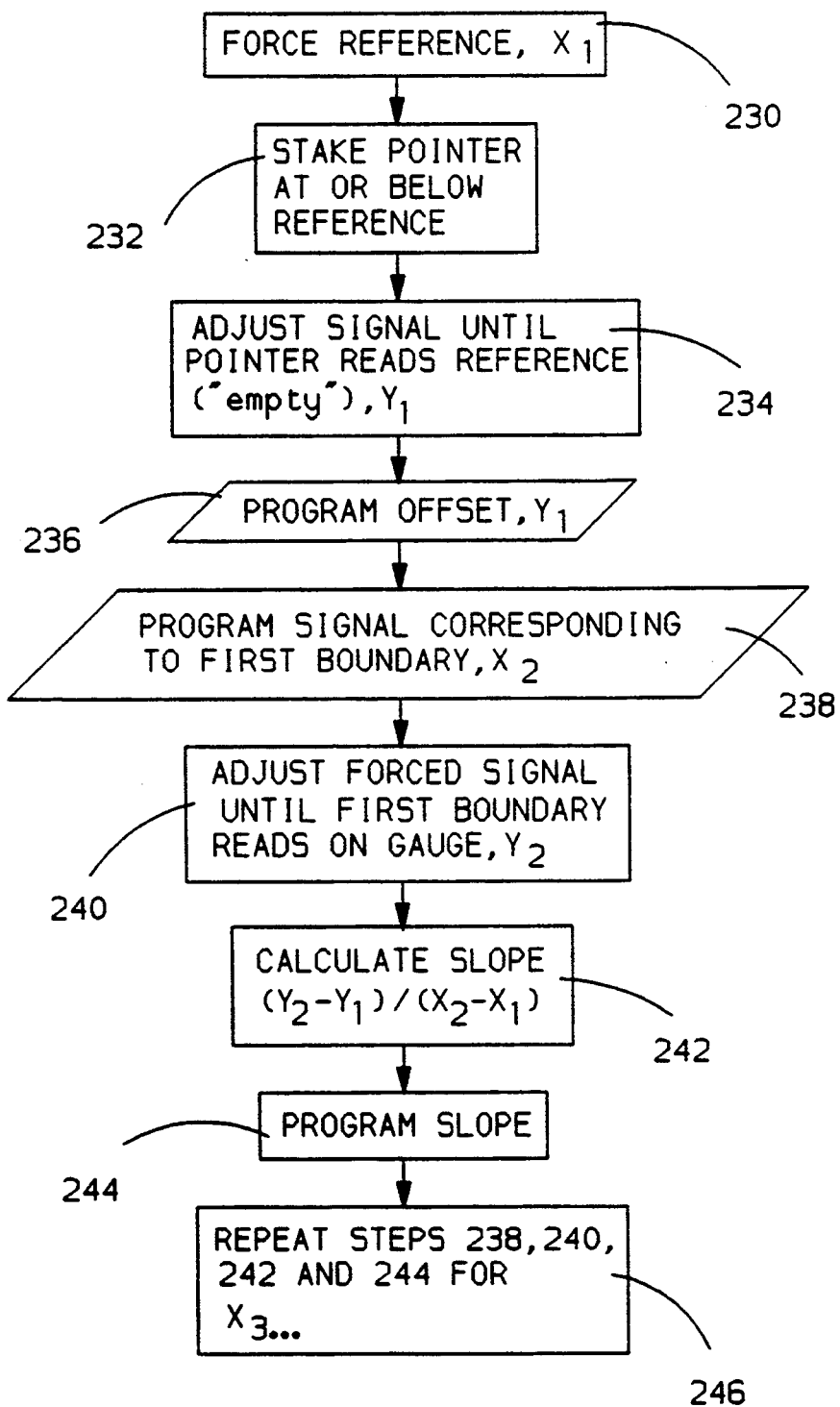
FIG. 22 is a flow chart for part of the manufacture process of certain embodiments of this invention.

Referring to FIG. 22, the preferred method of manufacture of the apparatus of this invention when the features of FIGS. 19-21 are implemented is set forth. The preferred display implementation is an analog gauge, such as an air core gauge. When analog gauges are manufactured in displays, typically the gauge is installed into the display without the pointer attached, and then the pointer is attached onto the shaft of the gauge. The attachment of the pointer to the shaft is called staking, and usually involves simply pressing the pointer onto the shaft.

The preferred method for manufacture requires, first, forcing a reference signal onto the circuit, such as at bus 336 (block 230). For fuel gauge systems, the reference signal preferably corresponds to the signal, $x_1$, that results on bus 336 corresponding to an empty fuel tank. Then, at block 232, the pointer is staked to the gauge, as close to reading the reference position, e.g., "empty," as possible. At block 234, the signal on bus 336 is changed until the pointer actually indicates the reference position, e.g., "empty," the resulting signal being referred to as $y_1$. At block 236, the value of $y_1$ is programmed into memory 272 as the lower boundary (i.e., point 210, FIG. 18, if the first reference is the lower boundary) and offset.

At step 238, a signal, $x_2$, known to correspond to the fuel level corresponding to the first boundary point, i.e., point 212, FIG. 18, is programmed into memory 272 (FIG. 19). For example, if the first boundary point is to be the ¼ full fuel level, $x_2$ may be determined by simply filling a sample fuel tank to ¼ full and determining the signal on bus 336. Presumably, this need only be done once for each system design. At step 240, the signal forced on bus 336 is changed until the gauge actually indicates the level corresponding to the first boundary point, this resultant signal is referred to as $y_2$. At step 242, the slope increment used with the system in FIG. 19 is calculated as: slope=$(y_2-y_1)/(x_2-x_1)$. This value is programmed, at step 244, into the memory 272 (FIG. 19) as the slope below the first boundary, i.e., the slope of the line segment between points 210 and 212, FIG. 18.

Step 246 indicates that steps 238-244 are repeated for the rest of the boundaries (points 216, 218 and 220, FIG. 18), if the system designer decides to implement more boundaries. For example, it may be desirable to have boundaries corresponding to ¼ full, ½ full, ¾ full, with the upper limit at full. In such case, when steps 238-244 are repeated for the second boundary, $y_2$ and $x_2$ for the first boundary become the new $y_1$ and $x_1$, and a new $x_2$ (previously determined by experimentation as the signal corresponding to a ½ full tank) is used and a new $y_2$ is determined at step 240. The method is likewise repeated for each boundary.

using the above method, the augmentations of this invention set forth in FIGS. 19-21 can be easily implemented by one skilled in the art, providing a fuel gauge linearly responsive to the actual amount of fuel in the fuel tank. The boundaries described above are just example boundaries and a designer may set the boundaries as desired, including eliminating them all together.

Figure 23:
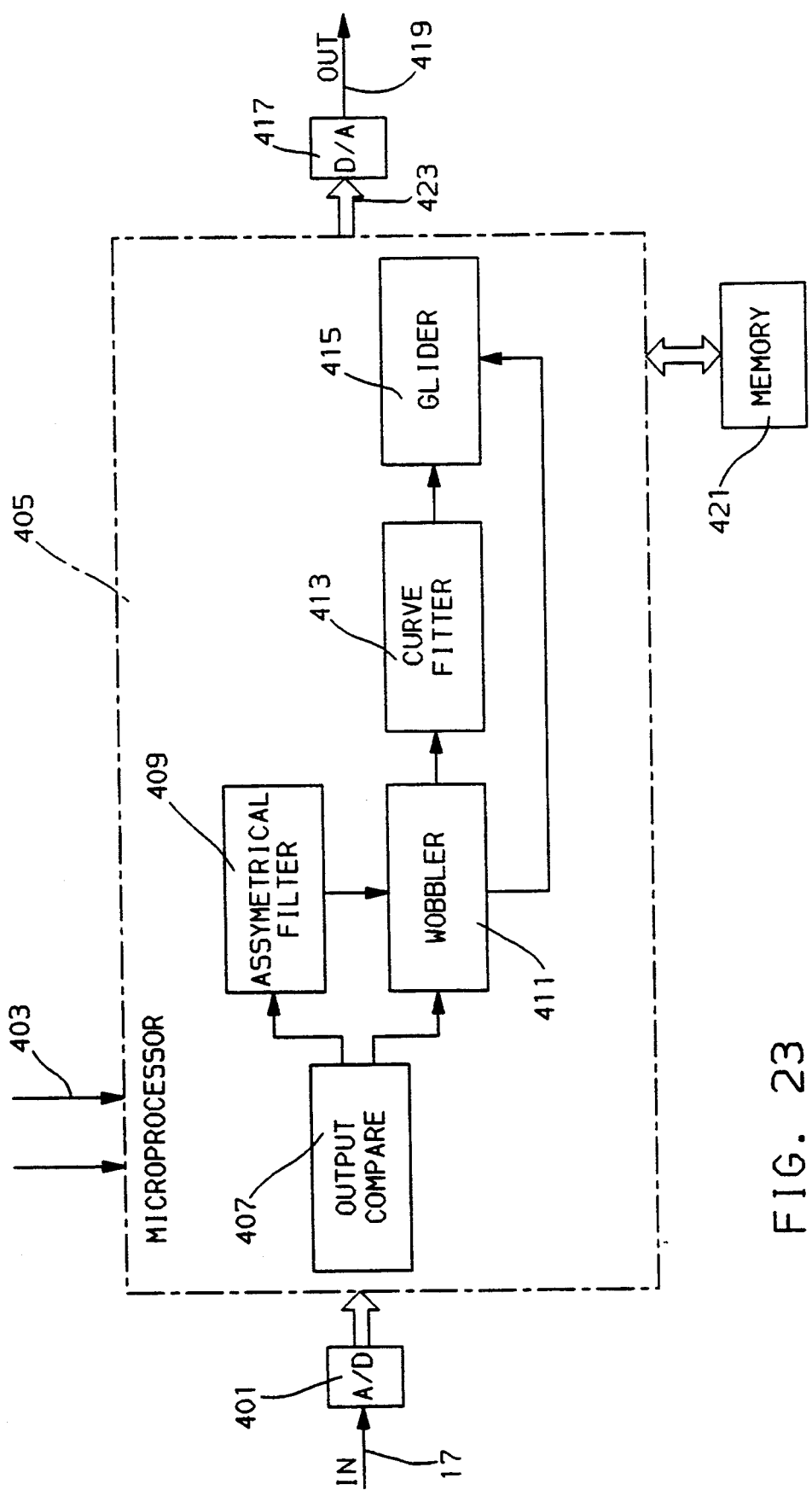
FIG. 23 illustrates apparatus for a microprocessor implementation of this invention.

Referring to the microprocessor implementation shown in FIG. 23, the sender input signal on line 17 is converted to a digital signal by A/D converter 401 and provided to microprocessor 405. Microprocessor 405 performs the functions required by this invention in accordance with a control program stored in memory 421, the input received from A/D converter 401, and other input lines such as lines 403.

In implementation of the subroutine stored in memory 421, microprocessor 405 periodically compares (block 407) the input from A/D converter 401 with the output provided to D/A converter 417, and performs the asymmetrical filtration, wobbler, curve fitter and glider functions (blocks 409, 411, 413 and 415, respectively). The output is provided to D/A converter 417, which provides an output signal on line 419 used to drive any known type of analog display or gauge. Alternatively, the digital output signal on bus 423 may be directly used to drive a digital or bar graph display.

Figure 24A:
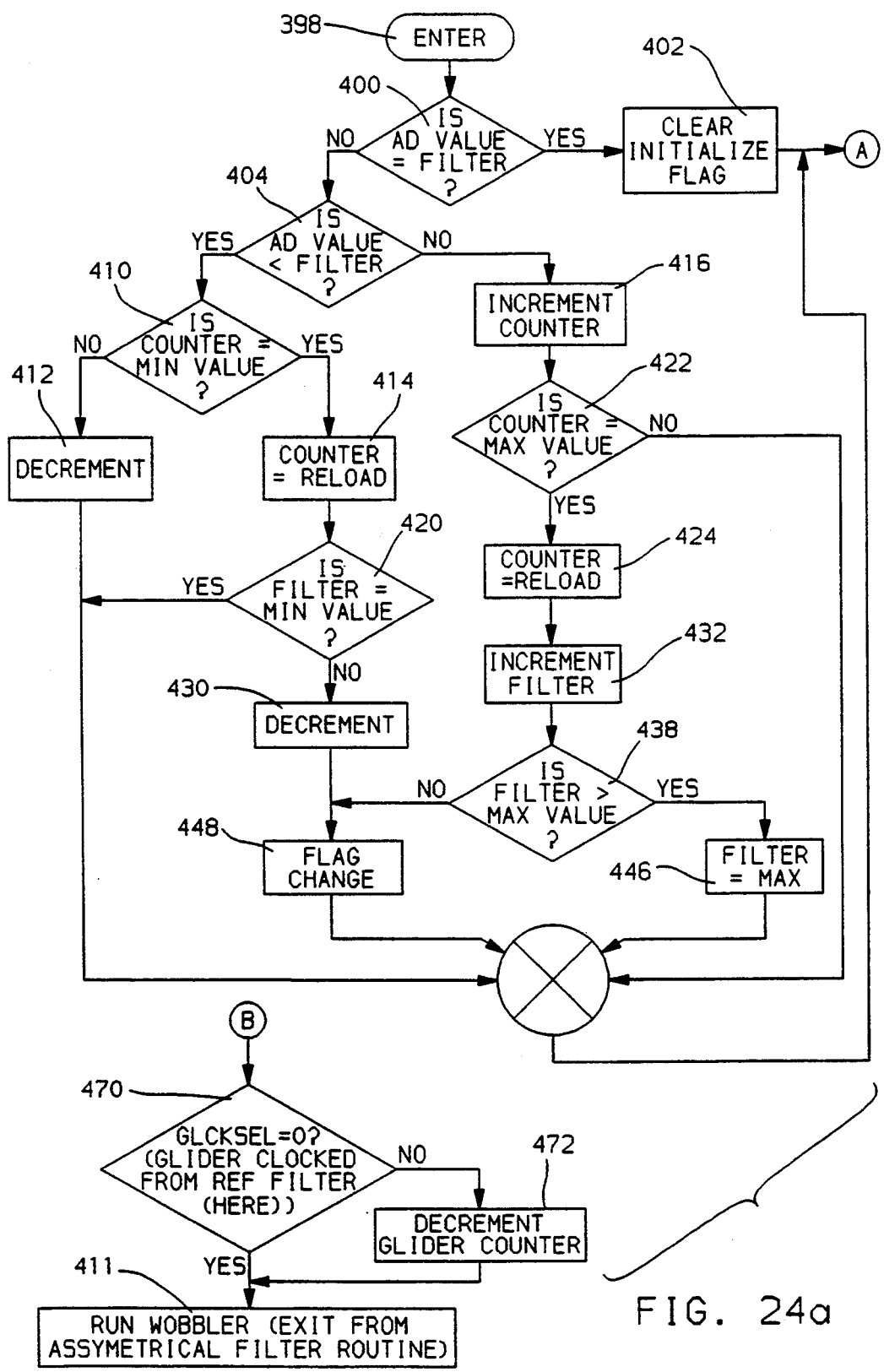
FIGS. 24a, 24b, 25 and 26 comprise a software flow routine for a microprocessor implementation of this invention.
Figure 24B:
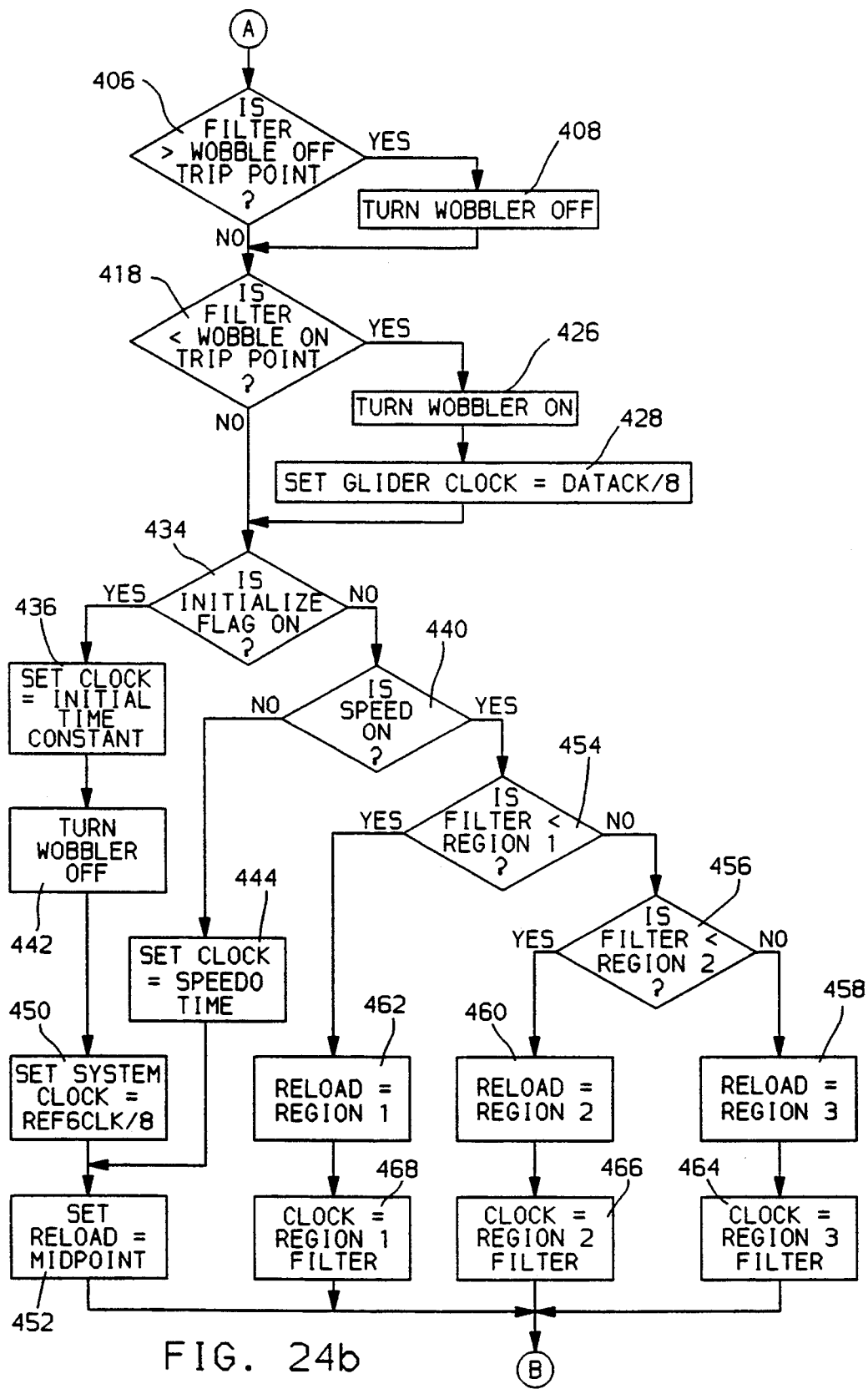

FIGS. 24a and 24b represent a flow diagram for a software subroutine corresponding to the functions of blocks 407 and 409 in FIG. 23. In the subroutine, the variables are defined as follows: RELOAD is the load variable for the first counter, and may be viewed as corresponding to the preset value of counter 300 in FIG. 15a; COUNTER is the value of the first counter, corresponding to the value of counter 300 in FIG. 15a; FILTER is the value of the second counter, corresponding to counter 318, FIG. 15a; CLOCK is a variable representing the frequency of both the first and second counters, corresponding to the clock signal on line 289, FIG. 15a; ADVALUE is the input from the sender through the A/D converter 401, corresponding to the signal on bus 280, FIG. 15a; WOBBLE-ON TRIP POINT and WOBBLE-OFF TRIP POINT represent the wobbler on and off points; and MAX VALUE is the maximum value of COUNTER1.

ADVALUE is received from the A/D input at the receipt of an interrupt. Block 400 determines whether or not ADVALUE is equal to FILTER. If ADVALUE equals FILTER, the asymmetrical filtering is bypassed and the routine continues through blocks 402, 406, 408 and 418 where it determines whether or not the wobbler should be on or off.

If the wobbler is turned on at block 426 and block 428 sets the glider clock appropriately. At block 434 the routine determines if the system is being initialized. If the system is initializing, CLOCK is set at block 436 to the initial time constant, the wobbler is turned off at block 442, the glider clock source is initialized at block 450, and at block 452 RELOAD is set to the mid-point value. At block 470, if the glider clock select is off, the routine moves to the block 472 where the glider clock is decremented. The routine then moves to block 411, where the wobbler routine is run.

Back at block 400, if ADVALUE is not equal to the FILTER, then the asymmetrical filter routine is run beginning at block 404. If ADVALUE is less than FILTER, at block 404, the routine moves to block 410, where COUNTER is compared to its minimum value. If COUNTER is not equal to its minimum value, COUNTER is decremented at block 412 and the routine advances to block 406.

If COUNTER is at the minimum value at block 410, it is reset at block 414 to the value RELOAD and FILTER is checked at block 420 to determine if it is at its minimum value. If FILTER is at its minimum value, then the routine moves to block 406. If FILTER is not at its minimum value, the routine moves to block 430 where FILTER is decremented, to block 448 where a flag is set indicating that the filter has been decremented and then to block 406.

At block 404, if ADVALUE is not less than FILTER, it is known that ADVALUE is greater than FILTER and the routine moves to block 416 where COUNTER is incremented. The routine then moves to block 422 where COUNTER is compared to its maximum value. If COUNTER is not equal to its maximum value, the routine moves to block 406. If COUNTER is equal to its maximum value, the routine moves to block 424 where COUNTER is set equal to RELOAD and then to block 432 where FILTER is incremented.

At block 438 the if FILTER is greater than its maximum value, FILTER is returned to its maximum value at block 446 and the routine moves to block 406. At block 438, if FILTER is not greater than its maximum value, a flag is set at block 448 and the routine continues to block 406.

At block 434, if the initialization flag is not on, the routine moves to block 440 where it tests for a signal from the speedometer input. If sufficient time has elapsed and there is not a signal from the speedometer input, the routine moves to block 444 where CLOCK is set to a fast time constant called SPEEDO-TIME CONSTANT and RELOAD is set to the mid-point of the range of COUNTER. The routine moves on to block 470.

If at block 440 there is no signal from the speedometer, the routine moves to block 454 where FILTER is compared to the variable REGION1. If at block 454 FILTER is less than REGION1, the routine moves to block 462 where RELOAD is assigned a REGION1 asymmetry value and to block 468 where CLOCK is set to the REGION1 filter constant.

If at block 454 FILTER is not less than REGION1, the routine moves to block 456 where FILTER is compared to REGION2. If filter is less than REGION2, the routine moves to block 460 where RELOAD is set equal to the REGION2 asymmetry value and at block 466 CLOCK is set equal to the REGION2 filter constant.

If at block 456 FILTER is not less than REGION2, the routine moves to block 458 where RELOAD is set equal to the REGION3 asymmetry value and the routine moves then to block 464 where CLOCK is set to the REGION3 filter constant. Blocks 464, 466 and 468 all continue to block 470 and to the wobbler routine at block 411.

Figure 25:
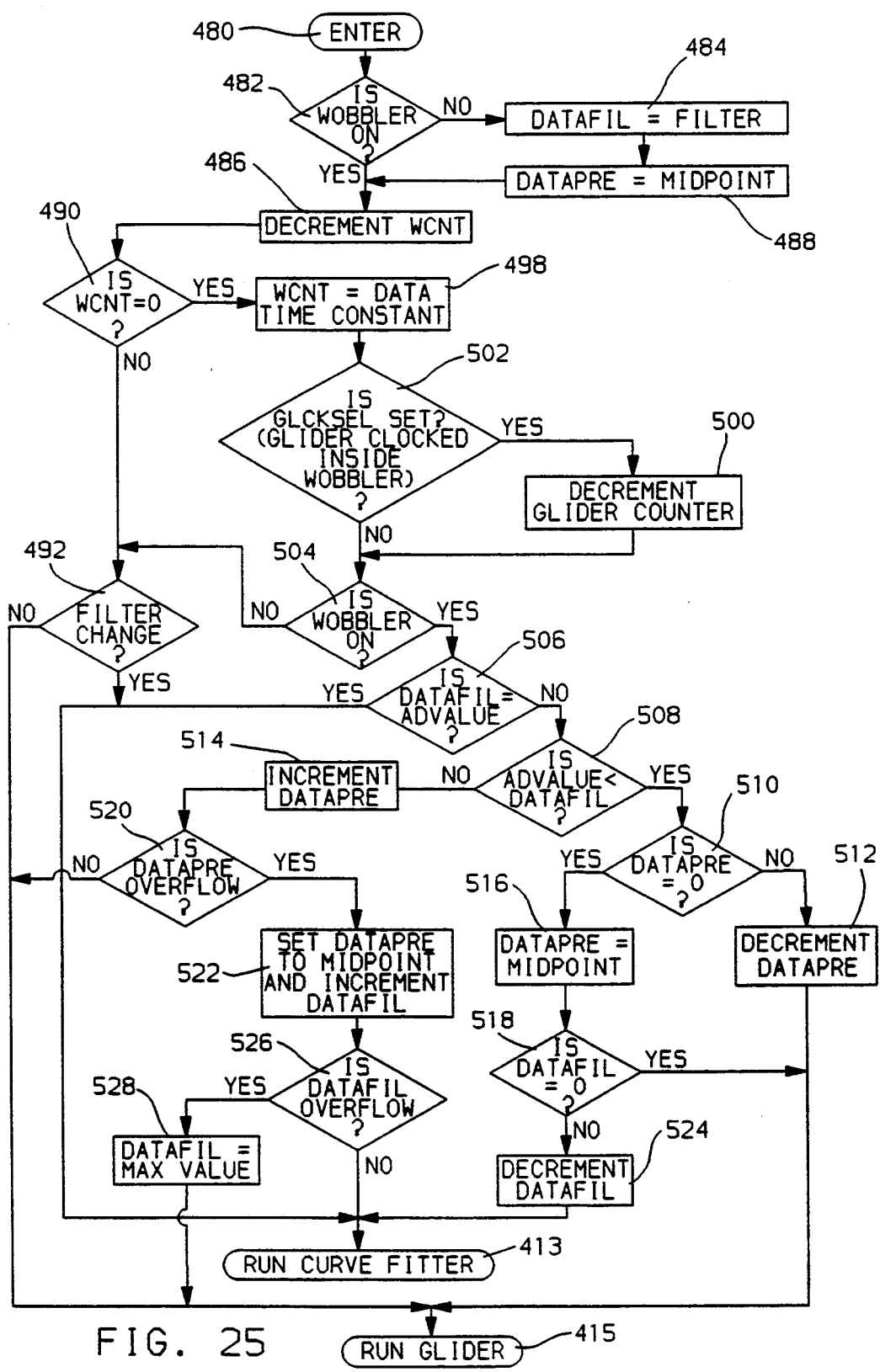

FIG. 25 represents a flow diagram for a software subroutine corresponding to the functions of block 411 in FIG. 23. In the subroutine, the variables are defined as follows: WCNT is a counter value that dictates how often the wobbler is updated; DATAPRE is the variable representing the wobbler prescaler; and DATAFILL is the wobbler counter output.

The wobbler routine begins at block 480 and moves to block 482 where it checks the wobbler flag to determine if the wobbler is on or off. If the wobbler is off, the routine moves to block 484 where DATAFILL is set equal to FILTER, then to block 488 where DATAPRE is set to its midpoint and then to block 486 where WCNT is decremented.

If at block 482 the wobbler is on, then the routine moves straight to block 486 and then to block 490. At block 490, WCNT is compared to zero. If WCNT is not equal to zero, the wobbler routine is not run and the routine moves to block 492. At block 492, the routine determines if FILTER had changed in the last program loop and, if so, the routine moves to block 413 where the curve fitter is run. The curve fitter (block 271, FIG. 15b) comprises a simple look-up table function to compensate for system nonlinearities. If, at block 492, it is determined that FILTER had not changed in the last program loop, the routine moves to block 415 where the glider is run.

If at block 490 the variable WCNT equals zero, the routine moves to block 498 where the variable WCNT is reloaded to DATA TIME CONSTANT. The routine then moves to block 502, where the glider clock flag is checked to determine if the glider clock is to be decremented at block 500. If yes, the routine moves to block 500 and decrements the glider clock counter.

The routine then moves to block 504 where it checks again to determine if the wobbler is on. If not, the routine moves to block 492. If the wobbler is on, the routine moves to block 506 where it compares DATAFILL with the ADVALUE. If the DATAFILL equals ADVALUE, the routine moves to block 413 where the curve fitter is run. If DATAFILL is not equal to ADVALUE, the routine moves to block 508 where it determines if ADVALUE is greater or less than DATAFILL. If DATAFILL is greater than ADVALUE, the routine moves to block 514 where it increments DATAPRE and then to block 520 where it checks for an overflow of DATAPRE. If there is no overflow, the routine moves to block 415 where the glider is run. If there is an overflow of DATAPRE at block 520, the routine moves to block 522 where DATAPRE is reset to its midpoint and where DATAFILL is incremented.

At block 526, DATAFILL is then checked for an overflow. If there is no overflow, the routine moves to block 413 where the curve fitter is run. If there is an overflow, then DATAFILL is reset to its maximum value at block 528 and the routine moves to block 415 where the glider is run. If at block 508 ADVALUE was less than DATAFILL, the routine moves to block 510 where DATAPRE is compared to zero. If DATAPRE is not equal to zero, the routine moves to block 512 where DATAPRE is decremented and the routine continues on to block 415.

At block 510, if DATAPRE is equal to zero, the routine moves to block 516 where DATAPRE is reset to its midpoint value and then to block 518 where DATAFILL is compared to zero. If DATAFILL equals zero at block 518, the routine moves to block 415 where the glider is run. If DATAFILL is not equal to zero, the routine moves to block 524 where DATAFILL is decremented. The routine then continues to block 413 where the curve fitter is run.

Figure 26:
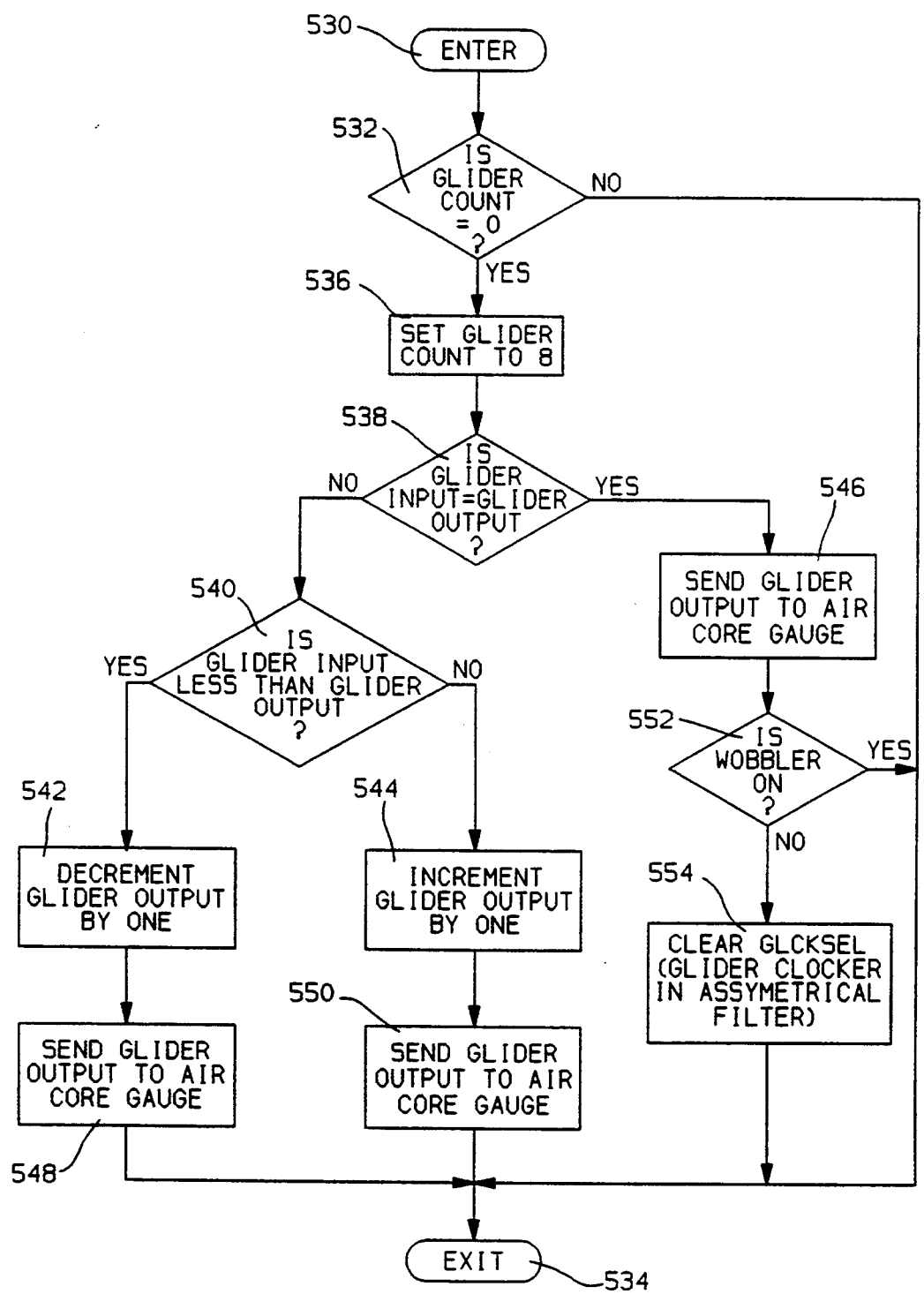

FIG. 26 represents a flow diagram for a software subroutine corresponding to the functions of block 415 in FIG. 23. In the subroutine, the variable GLIDER represents the value of the glider counter, corresponding to counter 350, FIG. 15b; GLIDER COUNT is a timing value used to determine when the glider is run; and INPUT is the value of the glider input received either from the wobbler or the curve fitter.

The glider routine begins at block 530 and moves to block 532, where GLIDER COUNT is compared to zero. If GLIDER COUNT does not equal zero, the glider routine is exited at block 534. If GLIDER COUNT equals zero, the routine continues to block 536, where GLIDER COUNT is set equal to eight.

At block 538, INPUT is compared to GLIDER. If INPUT equals GLIDER, the routine moves to block 546, where the value GLIDER is output to drive a display device. The routine then moves to block 552, where it checks to see if the wobbler is on, if yes, the glider routine is exited at block 534, If the wobbler is off, the glider clock source flag is cleared at block 554.

If, at block 538, INPUT does not equal GLIDER, the routine moves to block 540, where it is determined if INPUT is less than GLIDER. If INPUT is less than GLIDER, then GLIDER is decremented at block 542 and output to a display device at block 548. If INPUT is not less than GLIDER, then GLIDER is incremented at block 544 and output to a display device at block 550. The routine is then exited at block 534.

The above described implementations of this invention are not limiting in scope, but merely represent the preferred implementations. Where digital circuitry is presented, analog or computer alternatives are considered equivalents. Additionally, where analog circuitry is presented, digital or computer alternatives are considered equivalents. Moreover, various improvements and modifications to this invention may occur to those skilled in the art and fall within the scope of this invention as defined below.

The embodiments of the invention in which an exclusive property or privilege is claimed are defined as follows:

1. An apparatus for processing a data signal, comprising:
    means for providing a data signal;
    an up/down counter including an overflow output providing an overflow signal, an underflow output providing an underflow signal, and a reset that has a variable preset value determined in response to a control signal, the up/down counter (1) counting either up or down in response to the data signal, (2) outputting the overflow signal when the counter overflows, (3) outputting the underflow signal when the counter underflows, and (4) resetting to the determined variable preset value in response to the overflow signal or the underflow signal; and
    means for providing an output signal in response to the overflow and underflow signals, whereby the apparatus provides asymmetrical filtering of the data signal.

2. The apparatus set forth in claim 1 wherein the data signal is an analog signal indicative of a level of a liquid.

3. The apparatus set forth in claim 2 wherein the data signal means is a liquid level sender.

4. The apparatus set forth in claim 3 wherein the apparatus is in a motor vehicle and the liquid is fuel for the vehicle in a fuel tank.

5. The apparatus set forth in claim 1, wherein the output signal is an analog output signal, the apparatus also comprising means for comparing the analog output signal to the data signal and for providing a resultant comparison output signal, wherein the comparison output signal controls whether the up/down counter counts up or counts down.

6. The apparatus set forth in claim 5, also comprising means for providing a clock signal that is coupled to a clock input of the up/down counter.

7. The apparatus set forth in claim 5, also comprising:
    digital counting means, coupled between the up/down counter and the means for providing the analog output signal, for counting up in response to the overflow signal and for counting down in response to the underflow signal and for providing a digital output signal.

8. The apparatus set forth in claim 1 also comprising means for determining the variable preset value of the up/down counter.

9. The apparatus set forth in claim 5 also comprising means for determining the preset value of the up/down counter responsive to the analog output signal.

10. The apparatus set forth in claim 7, wherein the means for providing the data signal is a sender responsive to a level of a liquid, and wherein the apparatus also comprises:
    means for displaying an indication of the liquid level in response to the analog output signal.

11. The apparatus set forth in claim 7, wherein the means for providing the data signal is a sender responsive to a level of a liquid, and wherein the apparatus also comprises:
    means for displaying an indication of the liquid level in response to the digital output signal.

12. The apparatus set forth in claim 7 also comprising means for determining the preset value of the up/down counter responsive to the digital output signal.

13. The apparatus set forth in claim 9 wherein the means for determining the preset value of the up/down counter determines the preset value such that: the preset value is a first predetermined value if the analog output signal is below a first threshold, the preset value is a second predetermined value if the analog output signal is above the first threshold and below a second threshold, and the preset value is a third predetermined value if the analog output signal is above the second threshold.

14. The apparatus set forth in claim 12 wherein the means for determining the preset value of the up/down counter determines the preset value such that: the preset value is a first predetermined value if the digital output signal is below a first threshold, the preset value is a second predetermined value if the digital output signal is above the first threshold and below a second threshold, and the preset value is a third predetermined value if the digital output signal is above the second threshold.

15. The apparatus set forth in claim 4 wherein the asymmetrical filtering of the data signal provides a positive asymmetrical filter bias when filtering data signals indicative of a low levels of fuel in the tank and wherein the asymmetrical filtering of the data signal provides a negative asymmetrical filter bias when filtering data signal indicative of high levels of fuel in the tank, thereby compensating for biases caused by fuel slosh.

16. The apparatus set forth in claim 4 wherein, the fuel in the tank sloshes with vehicle motion and wherein the asymmetrical filtering of the data signal compensates for bias in the signal caused by fuel slosh.

17. In a movable vehicle, an apparatus for processing a signal from a sender that outputs the signal in relation to a level of liquid, comprising:
   means for comparing the sender signal to a process output signal;
   count means for incrementing and decrementing a count in response to the comparison and for providing an overflow signal when the count achieves a maximum and for providing an underflow signal when the count achieves a minimum, the count means resetting to a variable preset value between the maximum and minimum in response to either overflow or underflow signals;
   means for outputting the process output signal, increasing the process output signal in response to overflow signals and decreasing the process output signal in response to underflow signals, whereby the process output signal represents an asymmetrically filtered response to the sender signal.

18. The apparatus set forth in claim 17, also comprising means for determining the preset value of the count means in response to the process output signal.

19. The apparatus set forth in claim 17, also comprising a means for providing a clock signal to the count means.

20. The apparatus set forth in claim 17, wherein the count means comprises an up/down counter with an up/down select input connected to the comparing means, an overflow output, an underflow output and an input for selecting the variable preset value.

21. The apparatus set forth in claim 20 wherein the count means also comprises a clock input coupled to a means for providing a clock signal.

22. The apparatus set forth in claim 17, wherein the means for outputting a process output signal comprises a digital counter coupled to the count means, counting up in response to overflow signals therefrom and counting down in response to underflow signals therefrom.

23. The apparatus set forth in claim 22, wherein the means for outputting the process output signal also comprises a digital to analog converter.

24. The apparatus set forth in claim 17 also comprising means for displaying an indication of liquid level.

25. The apparatus set forth in claim 17, wherein the means for comparing the sender signal to the process output signal includes an analog comparator.

26. The apparatus set forth in claim 17 wherein the means for comparing the sender signal to the process output signal includes:
   an analog to digital converter, for converting the sender signal to a digital equivalent signal; and
   a digital comparator for comparing the digital equivalent signal to the process output signal.

27. The apparatus set forth in claim 17 wherein the means for comparing the sender signal to the process output signal includes:
   a digital to analog converter, for converting the process output signal to an analog process output signal; and
   an analog comparator for comparing the analog process output signal to the sender signal.

28. The apparatus set forth in claim 18 wherein the means for determining the preset value determines the preset value such that: the preset value is a first predetermined value if the process output signal is below a first threshold, the preset value is a second predetermined value if the process output signal is above the first threshold and below a second threshold, and the preset value is a third predetermined value if the process output signal is above the second threshold.

29. The apparatus set forth in claim 17 wherein the liquid is in a tank and the asymmetrical filtering provides a positive asymmetrical filter bias when filtering sender signals indicative of a low levels of fuel in the tank and wherein the asymmetrical filtering of the sender signal provides a negative asymmetrical filter bias when filtering sender signals indicative of high levels of fuel in the tank, thereby compensating for biases caused by fuel slosh.

30. The apparatus set forth in claim 17 wherein, the liquid is fuel in a tank and the liquid sloshes with vehicle motion and wherein the asymmetrical filtering of the data signal compensates for bias in the sender signal caused by fuel slosh and minimizes variations in the sender signal caused by fuel slosh.

31. An apparatus for processing liquid level data in a motor vehicle containing a liquid storage tank, comprising:
   means for developing a signal indicative of instantaneous liquid level in the storage tank;
   means for processing the instantaneous liquid level signal, including asymmetrical filtration of the instantaneous liquid level signal, to provide a process output signal; and
   means for displaying an indication of the level of liquid in the storage tank in response to the process output signal.

32. The apparatus set forth in claim 31, wherein the means for developing the instantaneous liquid level signal includes a sender.

33. The apparatus set forth in claim 31, wherein the processing means also includes:
   means for comparing the process output signal to the instantaneous liquid level signal and for providing a resultant comparison output signal, the comparison output signal being coupled to an up/down select of the up/down counter, wherein the comparison output signal controls whether the up/down counter counts up or counts down.

34. The apparatus set forth in claim 33, wherein the processing means also includes means for providing a clock signal that is coupled to a clock input of the up/down counter.

35. The apparatus set forth in claim 33, wherein the processing means also includes:
   digital counting means, coupled to the up/down counter, for counting up in response to overflow signals and for counting down in response to underflow signals.

36. The apparatus set forth in claim 31, wherein the processing means also includes means for determining the preset value of the up/down counter.

37. The apparatus set forth in claim 36 wherein the means for determining the preset value is responsive to the process output signal.

38. The apparatus set forth in claim 37 wherein the means for determining the preset value determines the preset value such that: the preset value is a first predetermined value if the process output signal is below a first threshold, the preset value is a second predetermined value if the process output signal is above the first threshold and below a second threshold, and the preset value is a third predetermined value if the process output signal is above the second threshold.

39. The apparatus set forth in claim 36 wherein the liquid is in a tank and the asymmetrical filtering provides a positive asymmetrical filter bias when filtering sender signals indicative of a low levels of fuel in the tank and wherein the asymmetrical filtering of the sender signal provides a negative asymmetrical filter bias when filtering sender signals indicative of high levels of fuel in the tank, thereby compensating for biases caused by fuel slosh.

40. The apparatus set forth in claim 31 wherein, the liquid is fuel in a tank and the liquid sloshes with vehicle motion and wherein the asymmetrical filtering of the instantaneous liquid level signal compensates for bias in the instantaneous liquid level signal caused by fuel slosh and minimizes variations in the instantaneous liquid level signal caused by fuel slosh.

41. The apparatus set forth in claim 36, wherein the means for determining the preset value includes an addressable memory having a data output connected to a preset input of the up/down counter, the addressable memory providing a memory output signal on the data output responsive to the process output signal, wherein the memory output signal is the preset value of the up/down counter.

42. An apparatus comprising:

means for receiving a data signal;

a comparator sequentially comparing a process output signal with the data signal and signals representing data stored in memory and providing comparison output signals responsive to the comparisons;

an up/down counter having an up/down control input responsive to the comparison output signal when the process output signal is compared to the data signal, the up/down counter also including a preset input which receives a preset signal, and overflow and underflow outputs providing overflow and underflow signals when the up/down counter overflows and underflows, respectively;

a digital counter responsive to the overflow and underflow signals of the up/down counter;

a state machine sequentially outputting control signals responsive to the overflow and underflow signals and the comparison output signals; and memory, sequentially providing to the comparator the signals representing data stored in memory, including the preset signal for the up/down counter, in response to the control signals.

43. The apparatus of claim 42, wherein the signals representing data stored in memory represent first and second break points, wherein, in response to the comparison output signals when the first and second break points are sequentially compared to the process output signal, the state machine determines a value of the preset signal.

* * * * *